(12) United States Patent
Iwamoto et al.

(10) Patent No.: US 10,895,714 B2
(45) Date of Patent: Jan. 19, 2021

(54) OPTICAL SYSTEM AND OPTICAL APPARATUS INCLUDING THE SAME

(71) Applicant: CANON KABUSHIKI KAISHA, Tokyo (JP)

(72) Inventors: Shunji Iwamoto, Utsunomiya (JP); Shinichiro Saito, Utsunomiya (JP); Satoshi Maetaki, Utsunomiya (JP); Takahiro Hatada, Utsunomiya (JP); Suguru Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 15/707,203

(22) Filed: Sep. 18, 2017

(65) Prior Publication Data
US 2018/0095242 A1 Apr. 5, 2018

(30) Foreign Application Priority Data
Sep. 30, 2016 (JP) .................................. 2016-193120

(51) Int. Cl.
| | |
|---|---|
| *G02B 9/62* | (2006.01) |
| *G02B 9/64* | (2006.01) |
| *G02B 9/12* | (2006.01) |
| *G02B 7/36* | (2006.01) |
| *G02B 13/00* | (2006.01) |
| *G02B 15/163* | (2006.01) |
| *G02B 9/34* | (2006.01) |

(52) U.S. Cl.
CPC ................. *G02B 9/64* (2013.01); *G02B 7/36* (2013.01); *G02B 9/12* (2013.01); *G02B 9/34* (2013.01); *G02B 13/004* (2013.01); *G02B 15/163* (2013.01)

(58) Field of Classification Search
CPC ...... G02B 13/0045; G02B 13/18; G02B 9/62; G02B 27/0025
USPC .................................................. 359/756–762
See application file for complete search history.

(56) References Cited

U.S. PATENT DOCUMENTS

| 4,643,536 A | 2/1987 | Yamada |
| 5,952,256 A | 9/1999 | Morishita et al. |

(Continued)

FOREIGN PATENT DOCUMENTS

| JP | 6-135738 A | 5/1994 |
| JP | 10-265238 A | 10/1998 |
| JP | 2015-215557 A | 12/2015 |

*Primary Examiner* — William R Alexander
*Assistant Examiner* — Tamara Y. Washington
(74) *Attorney, Agent, or Firm* — Canon U.S.A., Inc. IP Division

(57) ABSTRACT

An optical system used in an imaging apparatus includes an optical element. In a case where the optical element is disposed on a magnification side with respect to an intersection point of an optical axis and a chief paraxial ray, the optical element is a negative lens, and in a case where the optical element is disposed on a reduction side with respect to the intersection point, the optical element is a positive lens. The optical element is configured to satisfy all of the following conditional expressions:

$$30 \leq vd \leq 40$$

$$1.225 \leq [nd-(14.387/vd)] \leq 1.276$$

$$0.4300 \leq [\theta gF-(2.9795/vd)] \leq 0.5010,$$

where vd represents an Abbe number of the optical element, $\theta gF$ is a partial dispersion ratio of the optical element for g-line and F-line, and nd is a refractive index of the optical element for d-line.

14 Claims, 14 Drawing Sheets

(56) References Cited

U.S. PATENT DOCUMENTS

| | | | | |
|---|---|---|---|---|
| 6,985,302 B2* | 1/2006 | Nishida | ................ | G02B 15/177 |
| | | | | 359/683 |
| 7,057,831 B2* | 6/2006 | Ogawa | ................... | G02B 13/02 |
| | | | | 359/680 |
| 7,151,636 B2* | 12/2006 | Yasui | ..................... | G02B 13/16 |
| | | | | 359/680 |
| 7,164,544 B2* | 1/2007 | Ogawa | ................... | G02B 13/02 |
| | | | | 359/754 |
| 7,304,805 B2* | 12/2007 | Endo | ..................... | G02B 7/008 |
| | | | | 359/676 |
| 7,394,601 B2* | 7/2008 | Maetaki | ................. | G02B 13/16 |
| | | | | 359/642 |
| 7,508,600 B2* | 3/2009 | Ogawa | ................ | G02B 15/173 |
| | | | | 359/684 |
| 2005/0243434 A1* | 11/2005 | Endo | ................. | G02B 27/0012 |
| | | | | 359/642 |
| 2006/0285229 A1* | 12/2006 | Ogawa | ................... | G02B 13/02 |
| | | | | 359/754 |
| 2007/0014025 A1* | 1/2007 | Yokoyama | ......... | G02B 13/0095 |
| | | | | 359/642 |
| 2009/0080087 A1 | 3/2009 | Yamada et al. | | |
| 2009/0147380 A1* | 6/2009 | Yokoyama | ........... | G02B 15/142 |
| | | | | 359/766 |
| 2012/0250168 A1 | 10/2012 | Eguchi | | |
| 2016/0054549 A1 | 2/2016 | Takemoto | | |
| 2016/0077309 A1 | 3/2016 | Ohashi et al. | | |
| 2016/0274336 A1 | 9/2016 | Kawamura | | |
| 2016/0274443 A1 | 9/2016 | Ogata | | |

* cited by examiner

WIDE-ANGLE END

MIDDLE

TELEPHOTO END

WIDE-ANGLE END

MIDDLE

TELEPHOTO END

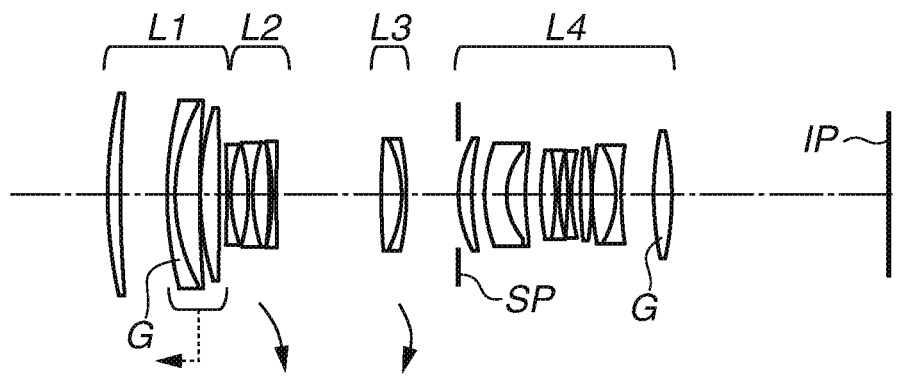
FIG.7A WIDE-ANGLE END
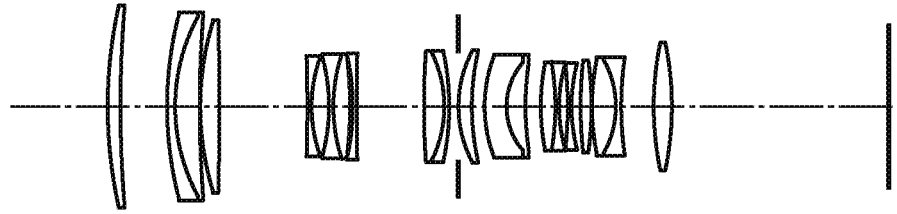
FIG.7B MIDDLE
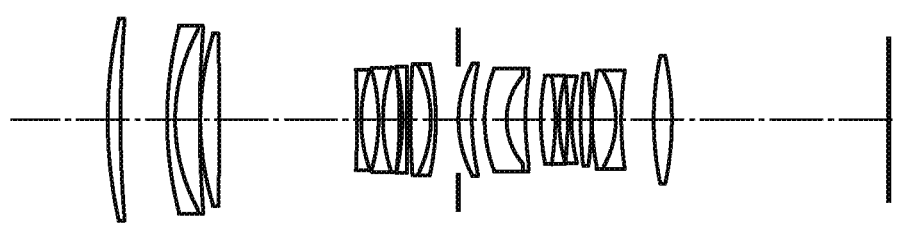
FIG.7C TELEPHOTO END

WIDE-ANGLE END

MIDDLE

TELEPHOTO END

WIDE-ANGLE END

MIDDLE

TELEPHOTO END

OPTICAL SYSTEM AND OPTICAL APPARATUS INCLUDING THE SAME

BACKGROUND OF THE INVENTION

Field of the Invention

The present invention relates to an optical system suitable for an optical apparatus such as a digital video camera, a digital still camera, a broadcasting camera, a silver-halide film camera, and a monitoring camera.

Description of Related Art

It is known that in a telephoto lens having a long focal length, axial chromatic aberration and magnification chromatic aberration are likely to occur. Magnification chromatic aberration is also known as lateral or transverse chromatic aberration. As a method for correcting the chromatic aberrations in a wide wavelength range, the use of an optical material having large dispersion and anomalous partial dispersibility is known.

Japanese Patent Application Laid-Open No. 10-265238 discusses optical glass having high dispersion and negative anomalous partial dispersibility.

SUMMARY OF THE INVENTION

The present invention is directed to an optical system in which chromatic aberration and field curvature are corrected.

According to an aspect of the present invention, an optical system in which a distance from a position where a paraxial marginal ray enters a lens surface closest to a magnification side to an optical axis is greater than a maximum value of a distance from a position where the paraxial marginal ray enters a lens surface on a reduction side with respect to an intersection point P between the optical axis and a chief paraxial ray to the optical axis, wherein the following conditional expressions are satisfied:

$$30 \leq vd \leq 40$$

$$1.225 \leq [nd-(14.387/vd)] \leq 1.276$$

$$0.4300 \leq [\theta gF-(2.9795/vd)] \leq 0.5010,$$

where vd is an Abbe number of the optical element, θgF is a partial dispersion ratio of the optical element for g-line and F-line, and nd is a refractive index of the optical element for d-line, and wherein, in a case where the optical element is disposed on the magnification side with respect to the point P, the optical element is a negative lens, and in a case where the optical element is disposed on the reduction side with respect to the point P, the optical element is a positive lens.

Further features of the present invention will become apparent from the following description of exemplary embodiments with reference to the attached drawings.

BRIEF DESCRIPTION OF THE DRAWINGS

FIGS. 7A, 7B, and 7C are cross-sectional views of an optical system according to a fourth exemplary embodiment at a wide-angle end, a middle zoom position, and a telephoto end.

DESCRIPTION OF THE EMBODIMENTS

Exemplary embodiments of an optical system according to the present invention and an optical apparatus including the optical system will be described below. The optical system according to each exemplary embodiment is an imaging lens system used in an imaging apparatus such as a digital still camera, a digital video camera, a broadcasting camera, a silver-halide film camera, and a monitoring camera. Further, the optical system according to each exemplary embodiment can also be used as a projection optical system for a projector. In each lens cross-sectional view, the left side is a magnification side (an object side in an imaging optical system; a screen side in a projection optical system for a projector), and the right side is a reduction side (an image side in an imaging optical system; an original image side in a projection optical system for a projector).

Figure 1:
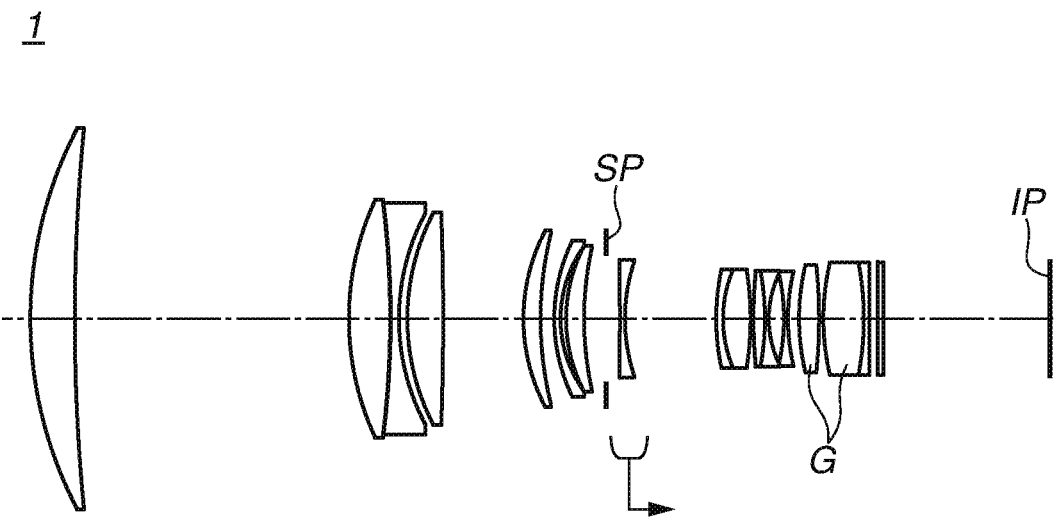
FIG. 1 is a cross-sectional view of an optical system according to a first exemplary embodiment.
Figure 2:
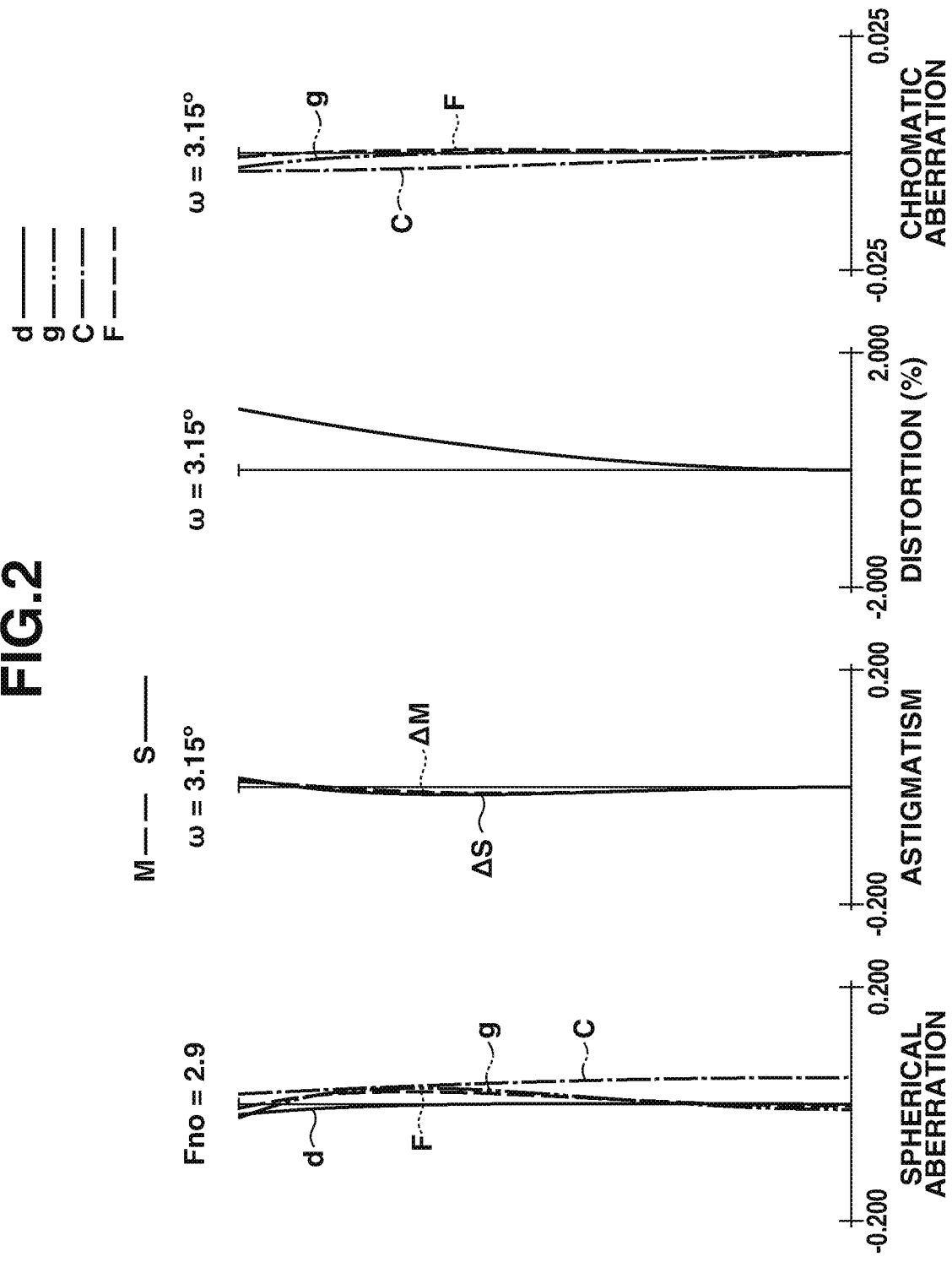
FIG. 2 is an aberration diagram of the optical system according to the first exemplary embodiment.

FIGS. 1, 3A, 3B, 3C, 5A, 5B, 5C, 7A, 7B, 7C, 9A, 9B, 9C, 11A, 11B, and 11C are cross-sectional views of optical systems according to first to sixth exemplary embodiments. An arrow illustrated in FIG. 1 indicates a moving direction of a lens in focusing from infinity to the closest distance.

Figure 3A:
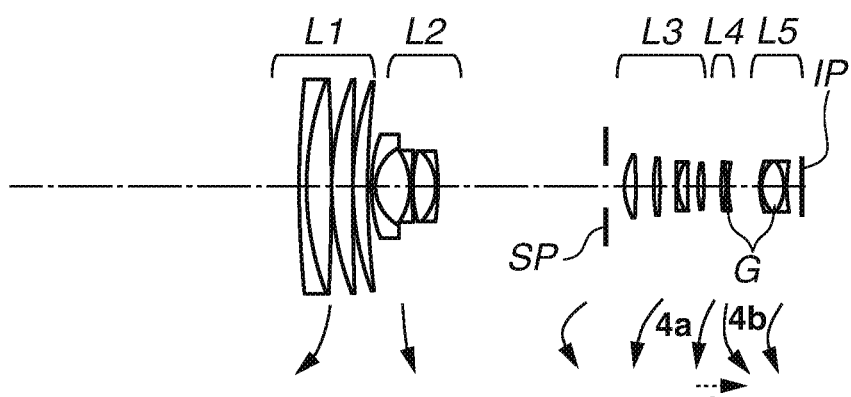
FIGS. 3A, 3B, and 3C are cross-sectional views of an optical system according to a second exemplary embodiment at a wide-angle end, a middle zoom position, and a telephoto end.
Figure 3B:
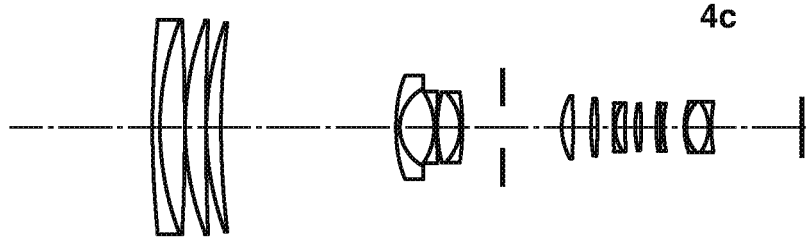
Figure 3C:
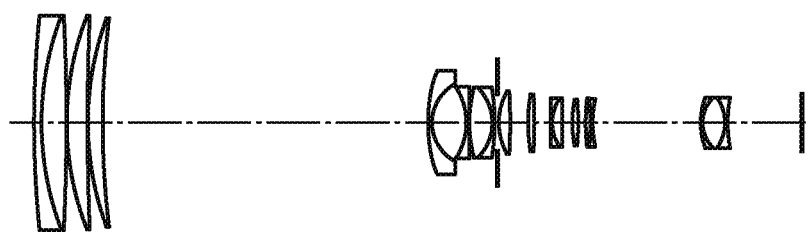
Figure 4A:
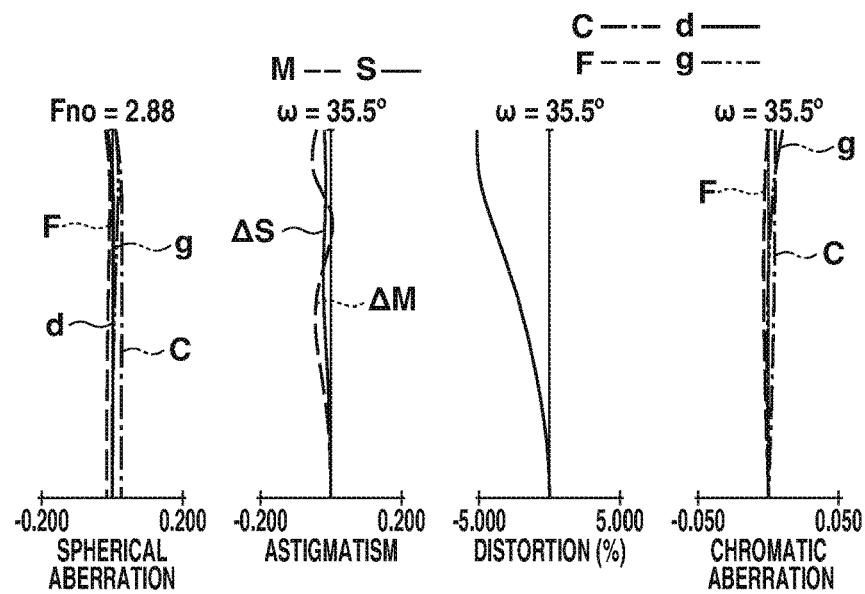
FIGS. 4A, 4B, and 4C are aberration diagrams of the optical system according to the second exemplary embodiment at the wide-angle end, the middle zoom position, and the telephoto end.
Figure 4B:
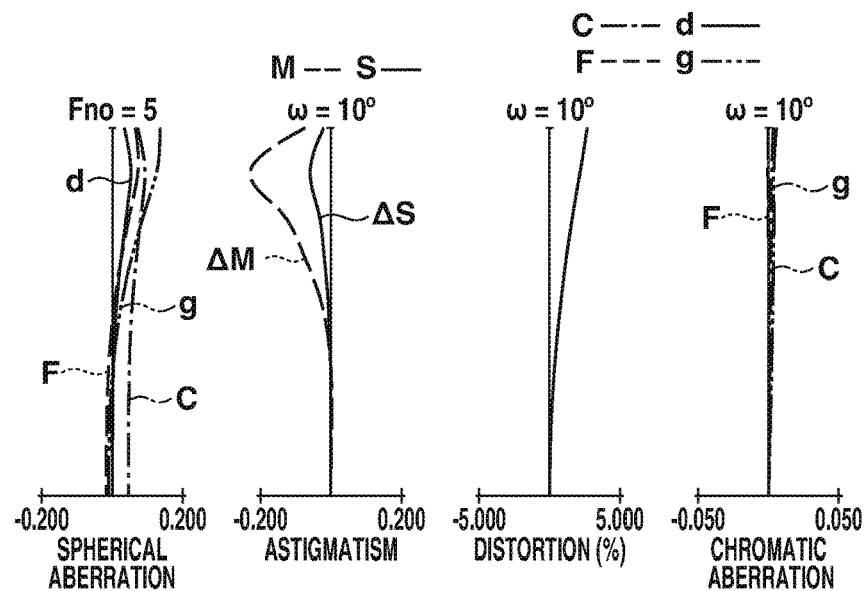
Figure 4C:
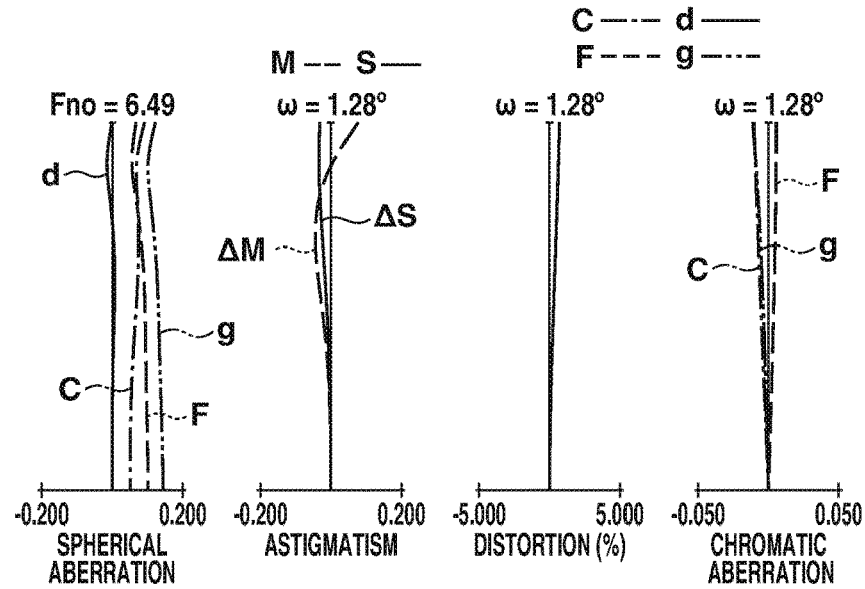

FIGS. 3A, 3B, and 3C illustrate first to fifth lens units L1 to L5. The number of lenses included in each lens unit is at least one. Arrows represented as solid lines in FIG. 3A indicate movement loci of the lens units in zooming from a wide-angle end to a telephoto end. An arrow 4a regarding the fourth lens unit L4 indicates the movement locus of the fourth lens unit L4 in zooming from the wide-angle end to the telephoto end when the lenses focus on infinity. An arrow 4b indicates the movement locus of the fourth lens unit L4 in zooming from the wide-angle end to the telephoto end when the lenses focus on the closest distance. An arrow 4c (a dotted line) regarding the fourth lens unit L4 indicates the moving direction of the fourth lens unit L4 in focusing from infinity to the closest distance.

Figure 5A:
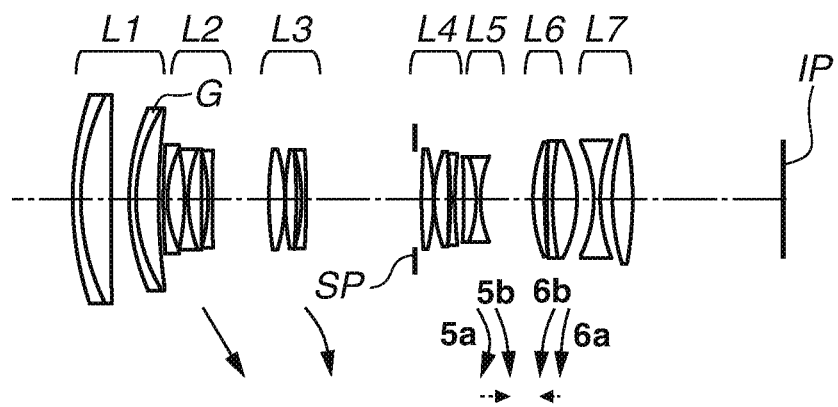
FIGS. 5A, 5B, and 5C are cross-sectional views of an optical system according to a third exemplary embodiment at a wide-angle end, a middle zoom position, and a telephoto end.
Figure 5B:
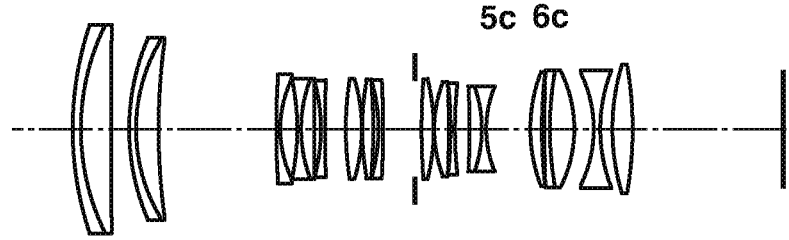
Figure 5C:
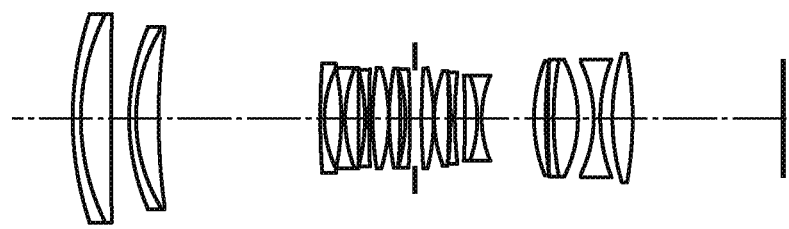
Figure 6A:
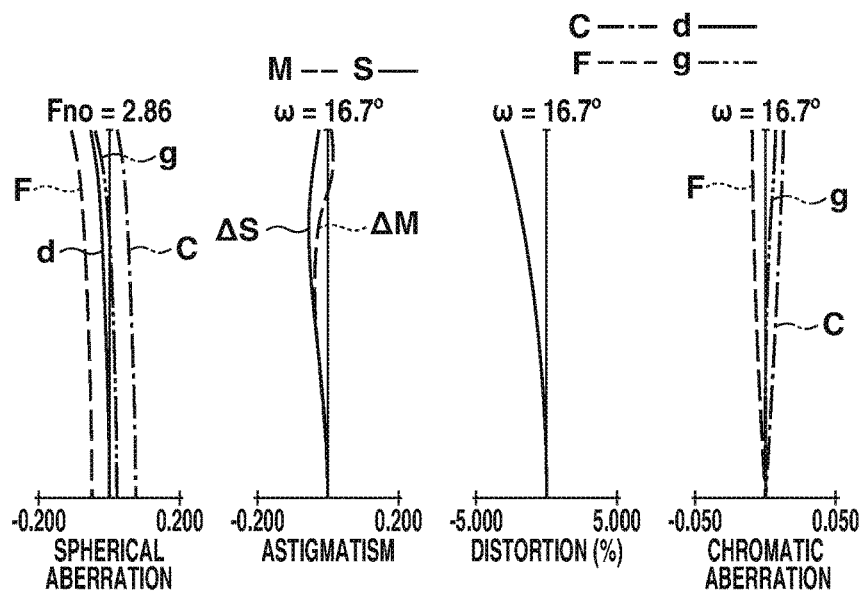
FIGS. 6A, 6B, and 6C are aberration diagrams of the optical system according to the third exemplary embodiment at the wide-angle end, the middle zoom position, and the telephoto end.
Figure 6B:
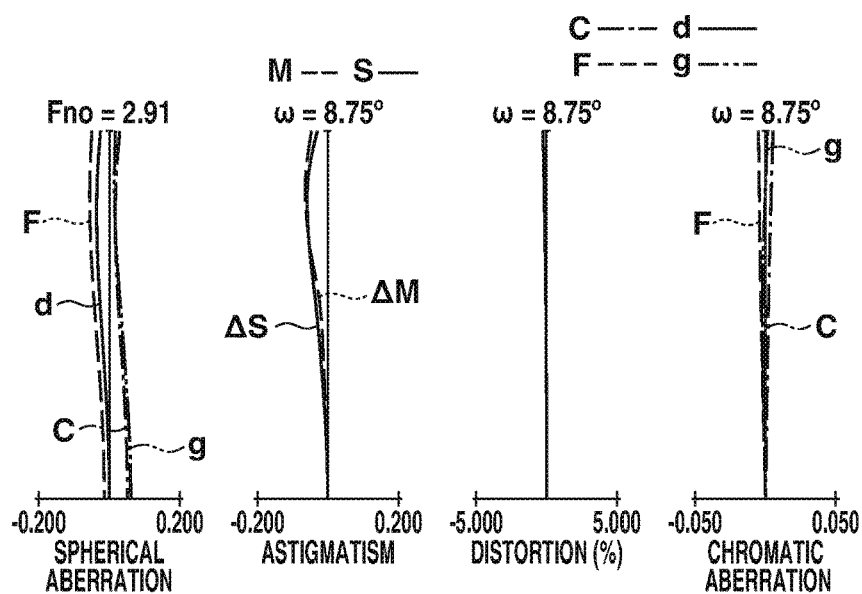
Figure 6C:
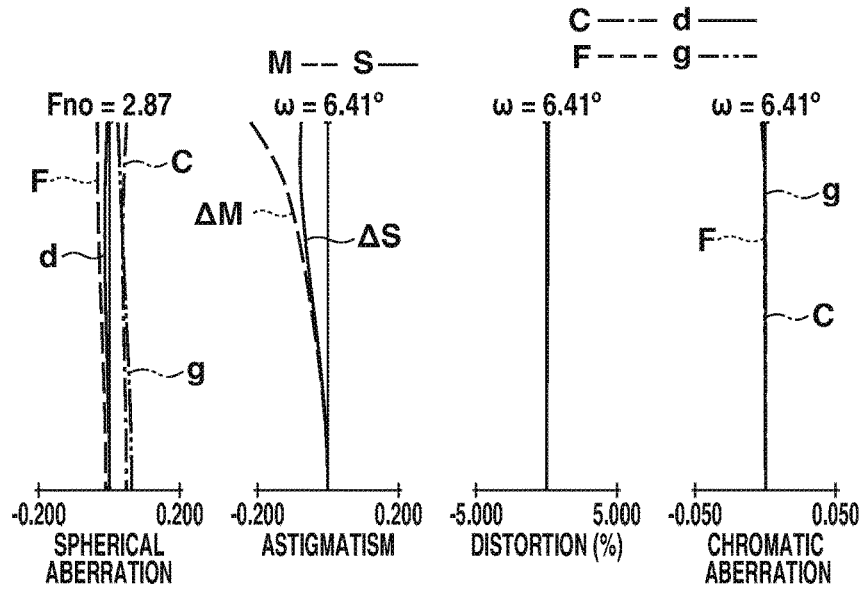
Figure 8A:
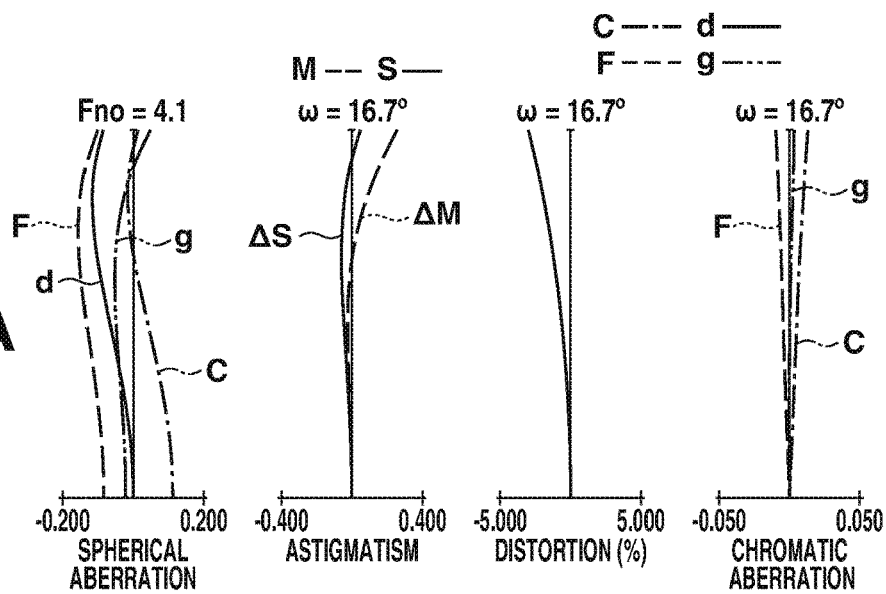
FIGS. 8A, 8B, and 8C are aberration diagrams of the optical system according to the fourth exemplary embodiment at the wide-angle end, the middle zoom position, and the telephoto end.
Figure 8B:
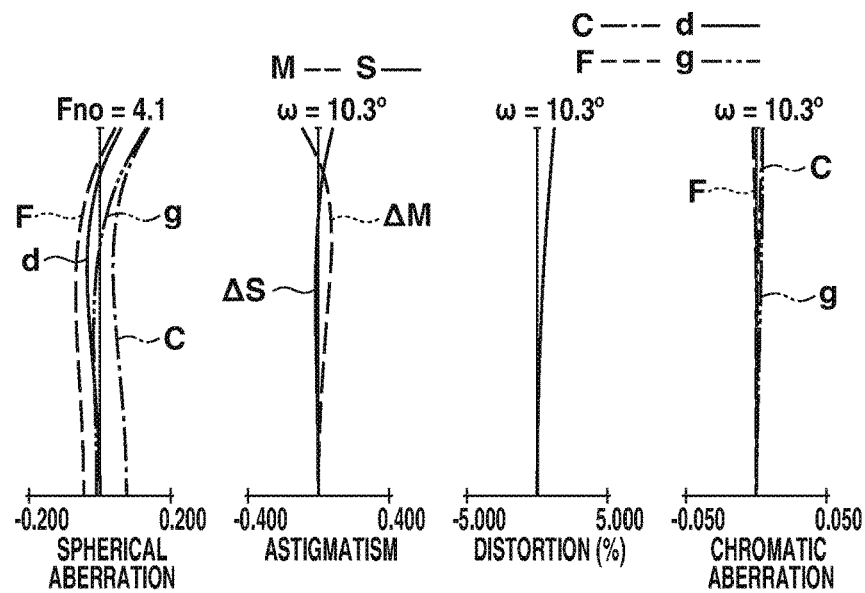
Figure 8C:
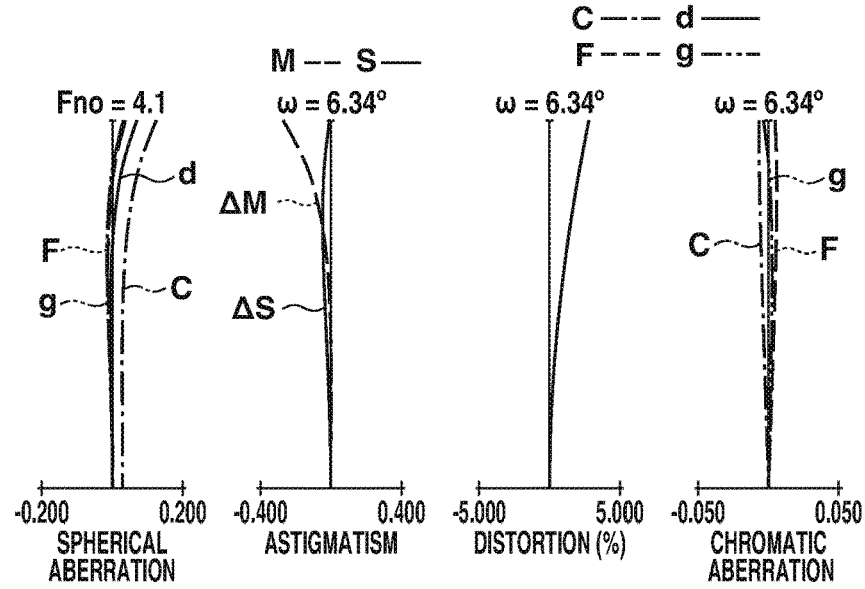
Figure 9A:
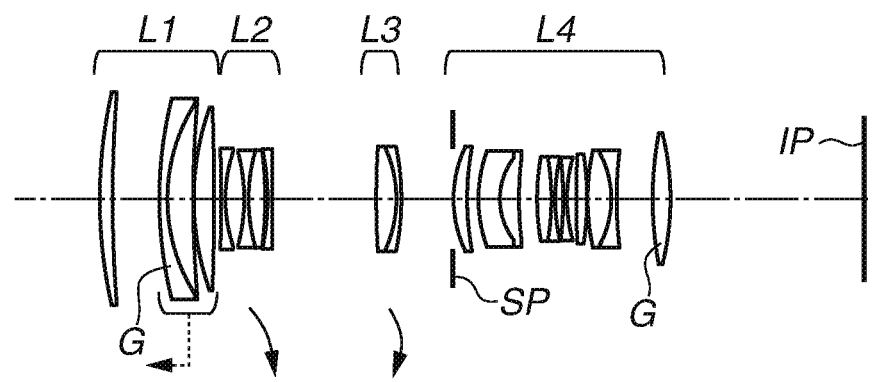
FIGS. 9A, 9B, 9C are cross-sectional views of an optical system according to a fifth exemplary embodiment at a wide-angle end, a middle zoom position, and a telephoto end.
Figure 9B:
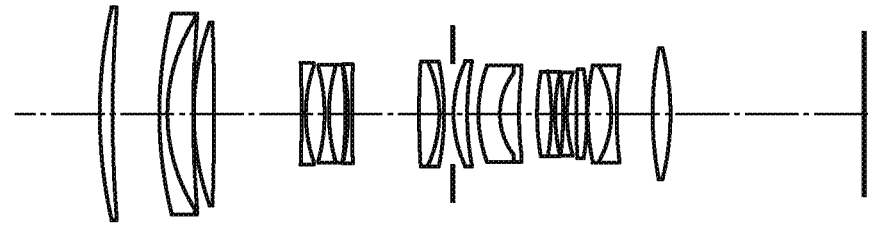
Figure 9C:
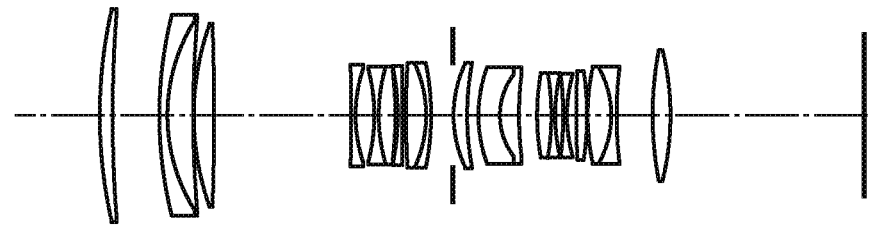
Figure 10A:
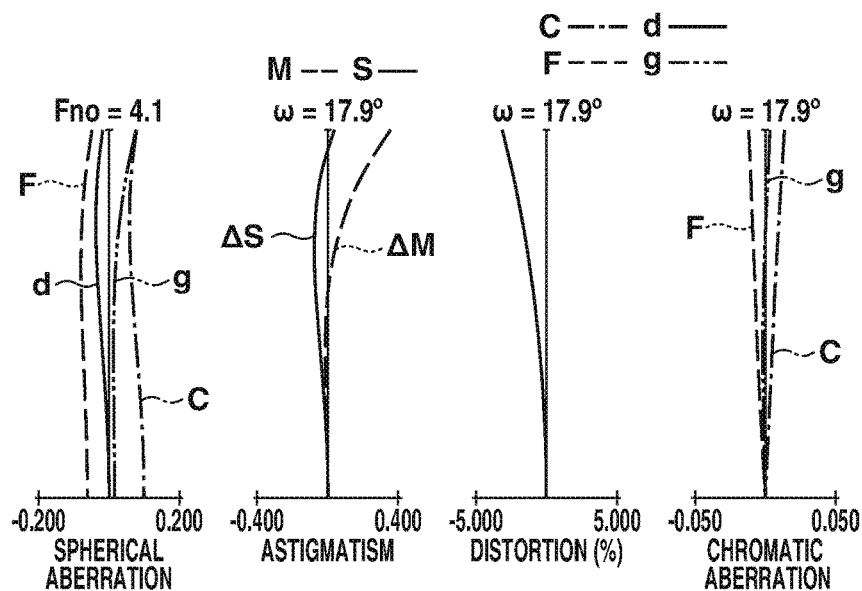
FIGS. 10A, 10B, and 10C are aberration diagrams of the optical system according to the fifth exemplary embodiment at the wide-angle end, the middle zoom position, and the telephoto end.
Figure 10B:
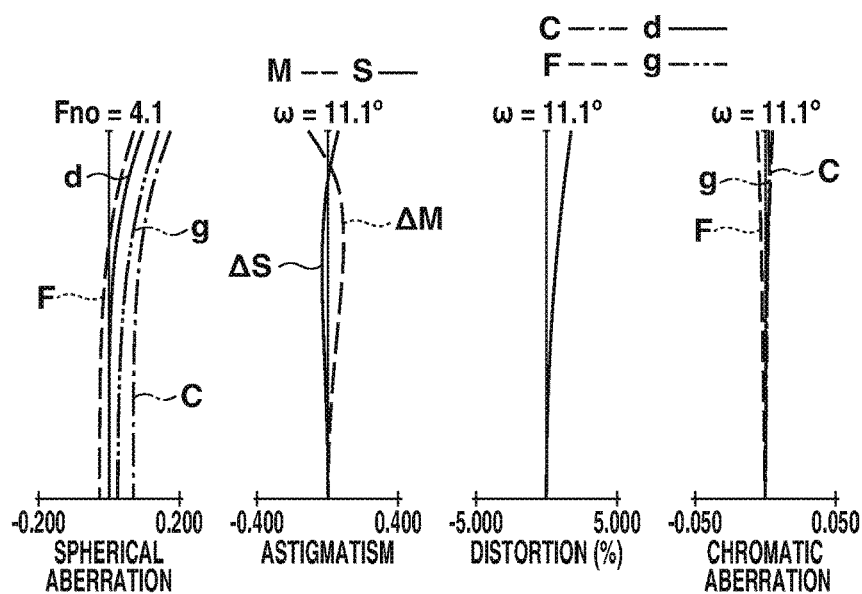
Figure 10C:
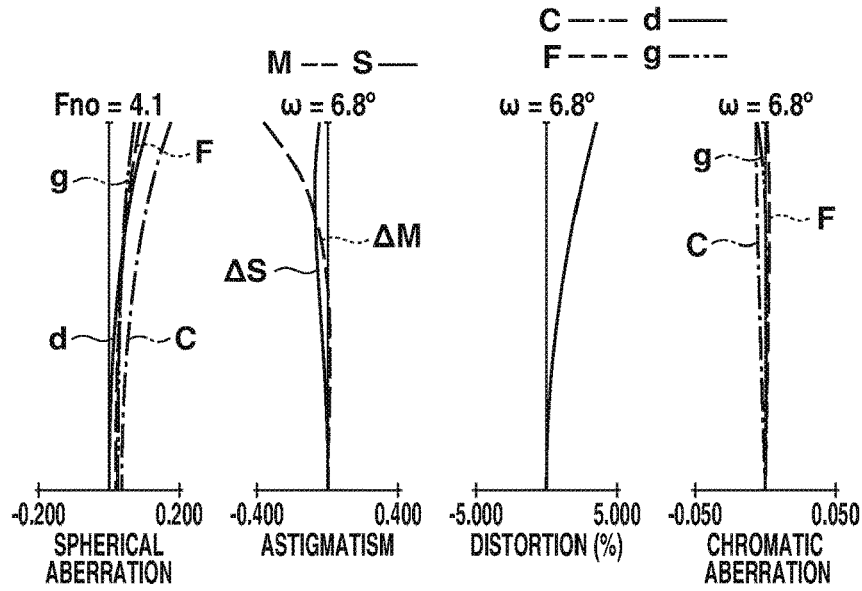
Figure 11A:
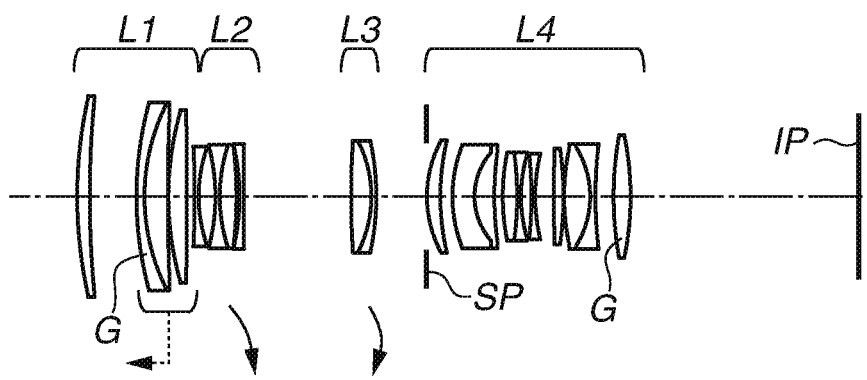
FIGS. 11A, 11B, and 11C are cross-sectional views of an optical system according to a sixth exemplary embodiment at a wide-angle end, a middle zoom position, and a telephoto end.
Figure 11B:
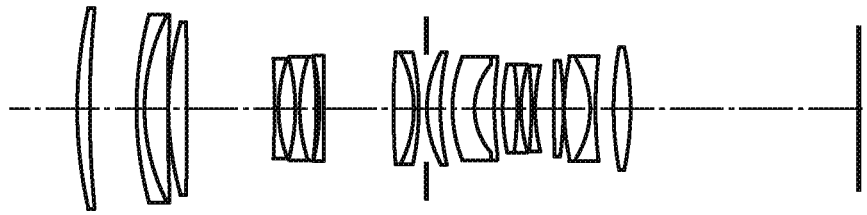
Figure 11C:
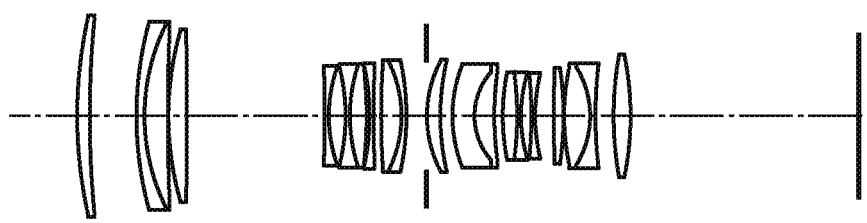
Figure 12A:
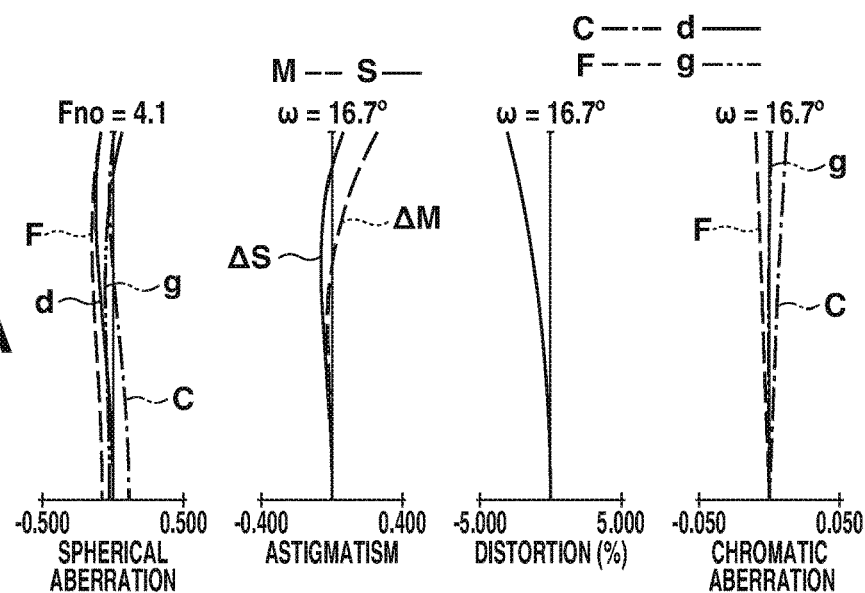
FIGS. 12A, 12B, and 12C are aberration diagrams of the optical system according to the sixth exemplary embodiment at the wide-angle end, the middle zoom position, and the telephoto end.
Figure 12B:
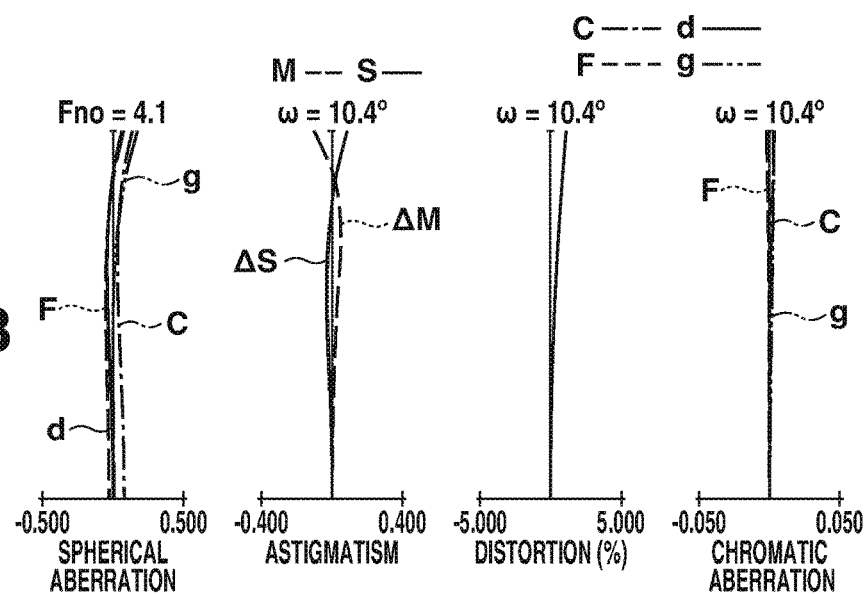
Figure 12C:
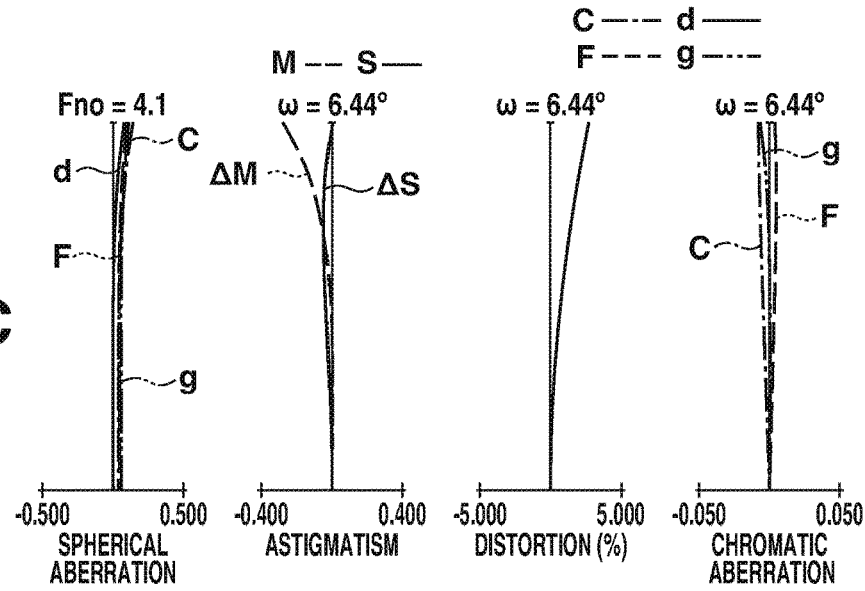

FIGS. 5A, 5B, and 5C illustrate first to seventh lens units L1 to L7. Arrows represented as solid lines in FIG. 5A indicate the movement loci of the lens units in zooming from a wide-angle end to a telephoto end. An arrow 5a regarding the fifth lens unit L5 indicates the movement locus of the fifth lens unit L5 in zooming from the wide-angle end to the telephoto end when the lenses focus on infinity. An arrow 5b indicates the movement locus of the fifth lens unit L5 in zooming from the wide-angle end to the telephoto end when the lenses focus on the closest distance. An arrow 5c (a dotted line) regarding the fifth lens unit L5 indicates the moving direction of the fifth lens unit L5 in focusing from infinity to the closest distance. An arrow 6a regarding the sixth lens unit L6 indicates the movement locus of the sixth lens unit L6 in zooming from the wide-angle end to the telephoto end when the lenses focus on infinity. An arrow 6b indicates the movement locus of the sixth lens unit L6 in zooming from the wide-angle end to the telephoto end when the lenses focus on the closest distance. An arrow 6c (a dotted line) regarding the sixth lens unit L6 indicates the moving direction of the sixth lens unit L6 in focusing from infinity to the closest distance. The first lens unit L1, the fourth lens unit L4, and the seventh lens unit L7 do not move in zooming.

FIGS. 7A, 7B, 7C, 9A, 9B, 9C, 11A, 11B, and 11C illustrate first to fourth lens units L1 to L4. Arrows represented as solid lines in each of FIGS. 7A, 9A, and 11A indicate the movement loci of the lens units in zooming from a wide-angle end to a telephoto end. The first lens unit L1 and the fourth lens unit L4 do not move in zooming. Further, an arrow represented as a dotted line indicates the moving direction of some lenses in the first lens unit L1, which move in focusing from infinity to the closest distance.

Further, each cross-sectional view illustrates an aperture stop SP and an image plane IP. When the optical system according to each exemplary embodiment is used as an imaging optical system of a video camera or a digital camera, an image sensor such as a charge-coupled device (CCD) sensor or a complementary metal-oxide-semiconductor (CMOS) sensor is placed on the image plane IP. When the optical system according to each exemplary embodiment is used as an imaging optical system of a silver-halide film camera, a film is placed on the image plane IP.

FIGS. 2, 4A, 4B, 4C, 6A, 6B, 6C, 8A, 8B, 8C, 10A, 10B, 10C, 12A, 12B, and 12C are aberration diagrams of the optical systems according to the first to sixth exemplary embodiments. Among these figures, FIGS. 4A, 6A, 8A, 10A, and 12A are aberration diagrams at the wide-angle ends, FIGS. 4B, 6B, 8B, 10B, and 12B are aberration diagrams at middle zoom positions, and FIGS. 4C, 6C, 8C, 10C, and 12C are aberration diagrams at the telephoto ends. In the aberration diagrams, Fno represents an F-number, and ω represents a half angle of view (degrees), which is an angle of view based on paraxial calculation. In each spherical aberration diagram, d (a solid line) represents the d-line (a wavelength of 587.6 nm), g (a two-dot chain line) represents the g-line (a wavelength of 435.8 nm), C (a one-dot chain line) represents the C-line (656.3 nm), and F (a dashed line) represents the F-line (486.1 nm).

In each astigmatism diagram, ΔS (a solid line) represents a sagittal image plane on the d-line, and ΔM (a dashed line) represents a meridional image plane on the d-line. In each distortion diagram, the d-line is illustrated. In each magnification chromatic aberration diagram, g (a two-dot chain line) represents the g-line, C (a one-dot chain line) represents the C-line, and F (a dashed line) represents the F-line.

Figure 13:
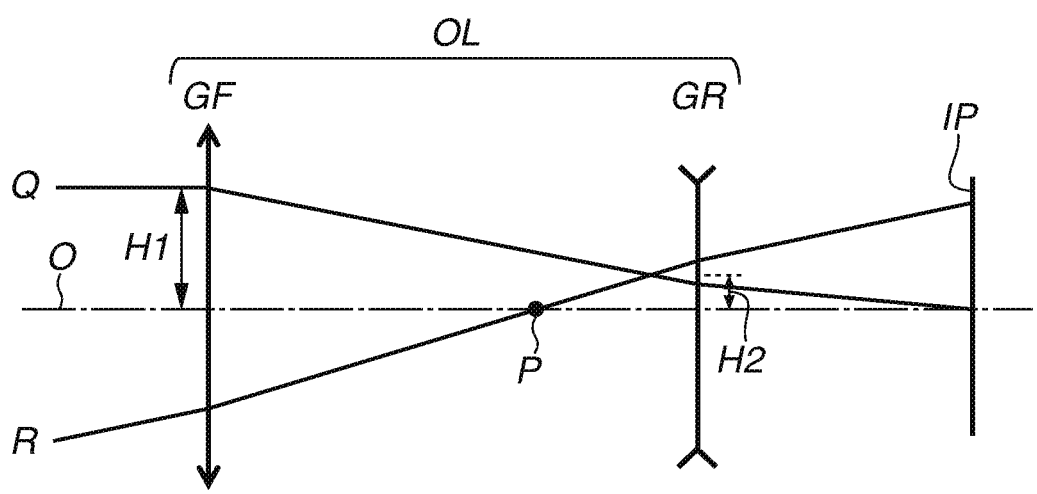
FIG. 13 is a schematic diagram of paraxial refractive power arrangement of a telephoto optical system.

With reference to FIG. 13, the optical system according to each exemplary embodiment will be described. The optical system according to each exemplary embodiment is an optical system in which the distance ("H1" in FIG. 13) from the position where a paraxial marginal ray enters the lens surface closest to the magnification side to the optical axis ("O" in FIG. 13) is greater than the maximum value of the distance ("H2" in FIG. 13) from the position where the paraxial marginal ray enters a lens surface on the reduction side with respect to an intersection point P of the optical axis and a chief paraxial ray to the optical axis. In the case of a zoom lens, it would suffice if the distance from the position where the paraxial marginal ray enters the lens surface closest to the magnification side at the telephoto end to the optical axis is greater than the maximum value of the distance from the position where the paraxial marginal ray enters a lens surface on the reduction side with respect to the intersection point P of the optical axis and the chief paraxial ray to the optical axis.

FIG. 13 is a schematic diagram of paraxial refractive power arrangement of a typical telephoto optical system OL. FIG. 13 illustrates a front lens unit GF, which has positive refractive power, and a rear lens unit GR, which has negative refractive power. Further, FIG. 13 illustrates a paraxial marginal ray Q and a chief paraxial ray R.

The paraxial marginal ray is a paraxial ray which is parallel to the optical axis of the optical system when the ray enters a lens and the height of which from the optical axis is 1 when the focal length of the entire optical system is normalized to 1. Further, the chief paraxial ray is, among rays incident at an angle of −45° with respect to the optical axis when the focal length of the entire optical system is normalized to 1, a paraxial ray passing through an intersection point P of an entrance pupil of the optical system OL and the optical axis. The angle of incidence of the optical system is determined such that an angle in a clockwise direction with respect to the optical axis is a positive angle, and an angle in a counterclockwise direction with respect to the optical axis is a negative angle. Further, an object is assumed to be present on the left side of the optical system, and a ray incident on the optical system from the object side is assumed to proceed from the left side to the right side. In other words, in FIG. 13, the left is the magnification side (the object side), and the right is the reduction side (the image side).

The optical system according to the present invention is not limited to the refractive power arrangement illustrated in FIG. 13. In the optical system, it would suffice if the distance from the position where the paraxial marginal ray enters the lens surface closest to the magnification side to the optical axis is greater than the maximum value of the distance from the position where the paraxial marginal ray enters the lens surface on the reduction side with respect to the point P.

The optical system according to each exemplary embodiment includes at least one optical element G satisfying all the following conditional expressions (1) to (3). In a case where the optical element G is disposed on the magnification side with respect to the point P, the optical element G is a negative lens. In a case where the optical element G is disposed on the reduction side with respect to the point P, the optical element G is a positive lens. Such an optical element G is provided in the optical system according to each exemplary embodiment, whereby it is possible to excellently correct chromatic aberration and field curvature.

$$30 \leq \nu d \leq 40 \quad (1)$$

$$1.225 \leq [nd-(14.387/\nu d)] \leq 1.276 \quad (2)$$

$$0.4300 \leq [\theta gF-(2.9795/\nu d)] \leq 0.5010 \quad (3)$$

In expressions (1) and (2), νd represents the Abbe number at the d-line of the optical element G. In expression (2), nd represents the refractive index at the d-line of the optical element G. In expression (3), θgF represents the partial dispersion ratio at the g-line and the F-line of the optical element G.

When the refractive indices at the g-line, the F-line, the d-line, and the C-line, which are the Fraunhofer lines, are represented as ng, nF, nd, and nC, respectively, the Abbe number νd is a value defined by the following expression (4). Further, the partial dispersion ratio θgF is a value defined by the following expression (5).

$$\nu d = (nd-1)/(nF-nC) \quad (4)$$

$$\theta gF = (ng-Nd)/(nF-nC) \quad (5)$$

Expressions (1) to (3) indicate that the optical element G has high dispersion, a low partial dispersion ratio, and a low refractive index. The reason why chromatic aberration and field curvature can be corrected using such an optical element G will be described below.

An axial chromatic aberration coefficient L(λ) and a magnification chromatic aberration coefficient T(λ) at an arbitrary wavelength λ of the optical system are given by the following expressions (6) and (7), respectively.

$$L(\lambda) = \Sigma(hi^2 \cdot \Phi i/\nu i(\lambda)) \quad (6)$$

$$T(\lambda) = \Sigma(hi \cdot Hi \cdot \Phi i/\nu i(\lambda)) \quad (7)$$

In these expressions, i represents a number obtained by counting the number of lenses from the object side. Further, Σ represents summation regarding i. hi represents the incident height of the paraxial marginal ray on an i-th lens. Hi represents the incident height of the chief paraxial ray on the i-th lens. Φi represents the refractive power of the i-th lens. νi(λ) represents a value defined by the following expression (8) when the refractive index of the i-th lens is ni(λ) and a design wavelength is λ0.

$$\nu i(\lambda) = (ni(\lambda 0)-1)/(ni(\lambda)-ni(\lambda 0)) \quad (8)$$

From expressions (6) and (7), the greater the dispersion of the lens, the greater the contribution of the lens to L(λ) and T(λ). This means that according to the aberration theory, it is possible to control chromatic aberration without greatly influencing various types of aberration other than chromatic aberration, such as spherical aberration, comatic aberration, and astigmatism. In contrast, to correct chromatic aberration using a lens formed of a low-dispersion material, it is necessary to give relatively large refractive power to the lens. In this case, however, even if chromatic aberration can be corrected, various types of aberration such as spherical aberration significantly change. Thus, when chromatic aberration is corrected, it is desirable to use a high-dispersion material.

Next, a description will be given of conditions necessary to correct chromatic aberration in the optical system according to each exemplary embodiment, using an optical element formed of a high-dispersion material.

Normally, in a telephoto lens, L(λ) exhibits characteristics in which the entire slope is negative and convex upward with respect to the wavelength. T(λ) exhibits characteristics in which the entire slope is positive and convex downward with respect to the wavelength. A case is considered where the optical element G is installed in such an optical system to correct chromatic aberration.

An axial chromatic aberration coefficient $L_G(\lambda)$ and a magnification chromatic aberration coefficient $T_G(\lambda)$ of the optical element G alone are given by the following expressions (9) and (10), respectively.

$$L_G(\lambda) = h_G^2 \cdot \Phi_G/\nu_G(\lambda) \quad (9)$$

$$T_G(\lambda) = h_G \cdot H_G \cdot \Phi_G/\nu_G(\lambda) \quad (10)$$

In these expressions, $h_G$ represents the incident height of the paraxial marginal ray in the optical element G. $H_G$ represents the incident height of the chief paraxial ray with respect to the optical element G. $\Phi_G$ represents the refractive power of the optical element G. $\nu_G(\lambda)$ represents a value given by $\nu_G(\lambda) = (n_G(\lambda 0)-1)/(n_G(\lambda)-n_G(\lambda 0))$ when the refractive index of the optical element G is $n_G(\lambda)$ and a design wavelength is λ0 at an arbitrary wavelength λ.

The wavelength dependency of $1/\nu_G(\lambda)$ reflects the wavelength dependency of $n_G(\lambda)$ as is. From expression (9), it is understood that whether the slope of the axial chromatic aberration coefficient $L_G(\lambda)$ with respect to the wavelength is positive or negative is determined based on the sign of the refractive power of the optical element G.

If $\Phi_G > 0$, the entire slope of $L_G(\lambda)$ is negative and convex downward. On the other hand, if $\Phi_G < 0$, the entire slope of $L_G(\lambda)$ is positive and convex upward. Thus, to cancel out a change in L(λ) with respect to the wavelength by $L_G(\lambda)$, it is necessary that $\Phi_G < 0$.

However, to correct axial chromatic aberration when $\Phi_G < 0$, both L(λ) and $L_G(\lambda)$ have characteristics in which the entire slope is convex upward. Thus, it is difficult to completely cancel out a change in L(λ) with respect to the wavelength by $L_G(\lambda)$. Thus, axial chromatic aberration remains on the short wavelength side. However, in a case where the optical element G has negative anomalous partial dispersibility, it is possible to reduce the wavelength dependency of $T_G(\lambda)$ on the short wavelength side. Thus, it is possible to reduce axial chromatic aberration in a wider wavelength range. Thus, to reduce axial chromatic aberration in a wider wavelength range, it is desirable that the optical element G has negative anomalous partial dispersibility. "Anomalous partial dispersibility" refers to properties in which partial dispersion characteristics are different from those of normal glass, and "negative anomalous partial dispersibility" refers to properties in which partial dispersion characteristics on the short wavelength side are smaller than those of normal glass.

Next, the correction of magnification chromatic aberration will be described.

From FIG. 13, in a case where the optical element G is disposed on the magnification side with respect to the point P (the intersection point of the chief paraxial ray and the optical axis), $H_G < 0$. In a case where the optical element G is disposed on the reduction side with respect to the point P, $H_G > 0$. Thus, whether the slope of $T_G(\lambda)$ is positive or negative is determined based on the position where the optical element G is placed and the sign of the refractive power of the optical element G.

First, a case is considered where the optical element G is disposed on the magnification side with respect to the point P. If $\Phi_G>0$, the entire slope of $T_G(\lambda)$ is positive and convex upward. On the other hand, if $\Phi_G<0$, the entire slope of $T_G(\lambda)$ is negative and convex downward. Thus, to cancel out a change in $T(\lambda)$ with respect to the wavelength by $T_G(\lambda)$ in a case where the optical element G is placed on the magnification side with respect to the point P, it is necessary that $\Phi_G<0$. This is the same as the above conditions necessary to correct axial chromatic aberration. Thus, by placing the optical element G as a negative lens on the magnification side with respect to the point P, it is possible to simultaneously correct axial chromatic aberration and magnification chromatic aberration.

Next, a magnification chromatic aberration coefficient $T_G(\lambda)$ in a case where the optical element G is placed on the reduction side with respect to the point P is considered. If $\Phi_G>0$, the entire slope of $T_G(\lambda)$ is negative and convex downward. On the other hand, if $\Phi_G<0$, the entire slope of $T_G(\lambda)$ is positive and convex upward. Thus, to cancel out a change in $T(\lambda)$ with respect to the wavelength by $T_G(\lambda)$ in a case where the optical element G is placed on the reduction side with respect to the point P, it is necessary that $\Phi_G>0$. This is opposite to the above conditions necessary to correct axial chromatic aberration. From FIG. 13, however, because $0<h_G<H_G$ holds true on the reduction side with respect to the point P, and therefore, $0<h_G^2<h_G \cdot H_G$. Thus, by placing the optical element G as a positive lens on the reduction side with respect to the point P, it is possible to correct magnification chromatic aberration without greatly influencing axial chromatic aberration.

However, whether the optical element G is placed on the magnification side with respect to the point P or on the reduction side with respect to the point P, both $T(\lambda)$ and $T_G(\lambda)$ have characteristics in which the entire slope is convex downward. Thus, it is difficult to completely cancel out a change in $T(\lambda)$ with respect to the wavelength by $T_G(\lambda)$. As a result, magnification chromatic aberration remains on the short wavelength side. If, however, the optical element G has negative anomalous partial dispersibility as described above, it is possible to reduce the wavelength dependency of $T_G(\lambda)$ on the short wavelength side. Thus, it is possible to reduce magnification chromatic aberration in a wider wavelength range. Thus, also to reduce magnification chromatic aberration in a wider wavelength range, it is desirable that the optical element G has negative anomalous partial dispersibility.

However, a conventionally used material having high dispersion and negative anomalous partial dispersion tends to have a large refractive index. To correct magnification chromatic aberration using such a known material, it is difficult to approximate the value of the Petzval sum of the optical system to 0, and therefore, it is difficult to correct field curvature.

The optical system according to each exemplary embodiment excellently corrects magnification chromatic aberration and field curvature by forming the optical element G using an optical material having high dispersion and a low partial dispersion ratio, but having a relatively small refractive index.

Next, conditional expressions (1) to (3) will be described.

Expression (1) is related to the Abbe number of the optical element G. If dispersion is so small that the value of $\nu d$ exceeds the upper limit of conditional expression (1), it is difficult to correct primary chromatic aberration using the optical element G. Further, if dispersion is so large that the value of $\nu d$ falls below the lower limit, the transmittance of the optical element G decreases, or the environment resistance of the optical element G deteriorates.

To make the effect of correcting primary chromatic aberration greater, it is desirable that expression (1) should be in the range of the following expression (1a). It is more desirable that expression (1) should be in the range of expression (1b).

$$31 \le \nu d \le 39.5 \tag{1a}$$

$$32 \le \nu d \le 38 \tag{1b}$$

Expression (2) is an expression defining the relationship between the refractive index and the Abbe number of the optical element G. In a case where the optical element G is used as a negative lens, and if the refractive index of the optical element G is so large that the relationship exceeds the upper limit of expression (2), the Petzval sum becomes too large in the positive direction. As a result, it is difficult to correct field curvature. Further, if the refractive index of the optical element G is so small that the relationship falls below the lower limit, the curvature of the optical element G required to sufficiently correct magnification chromatic aberration becomes large. Thus, it is difficult to configure the optical system in a downsized manner.

On the other hand, in a case where the optical element G is used as a positive lens, and if the refractive index of the optical element G is so large that the relationship exceeds the upper limit of expression (2), the refractive power of a lens unit placed on the reduction side with respect to the point P becomes great. Thus, it is difficult to secure back focus. Further, if the refractive index of the optical element G having positive refractive power is so small that the relationship falls below the lower limit, the Petzval sum becomes too large in the positive direction. As a result, it is difficult to correct field curvature.

To achieve both the correction of field curvature and the downsizing of the optical system in a balanced manner, it is desirable that expression (2) should be in the range of the following expression (2a). It is more desirable that expression (2) should be in the range of expression (2b).

$$1.235 < [nd - (14.387/\nu d)] < 1.273 \tag{2a}$$

$$1.245 < [nd - (14.387/\nu d)] < 1.270 \tag{2b}$$

Conditional expression (3) is related to the negative anomalous partial dispersibility of the optical element G. If the anomalous partial dispersibility of the optical element G is so small as to exceed the upper limit of expression (3), it is difficult to sufficiently correct secondary chromatic aberration using the optical element G. Further, if the negative anomalous partial dispersibility is so strong as to fall below the lower limit, it is difficult to manufacture a glass material satisfying expressions (1) and (2).

To reduce primary chromatic aberration and secondary chromatic aberration in a balanced manner, it is desirable that expression (3) should be in the range of the following expression (3a). It is more desirable that expression (3) should be in the range of expression (3b).

$$0.4650 < [\theta gF - (2.9795/\nu d)] < 0.5005 \tag{3a}$$

$$0.4800 < [\theta gF - (2.9795/\nu d)] < 0.5000 \tag{3b}$$

An optical material satisfying expressions (1), (2), and (3) can be obtained by, for example, adding $ZrO_2$ or an alkali metal oxide to a raw material of $SiO_2$—$Nb_2O_5$ optical glass and melting the resulting product. For example, $SiO_2$—$Nb_2O_5$ optical glass illustrated in Japanese Patent Application Laid-Open No. 10-265238 and optical glass including an alkali metal illustrated in Japanese Patent Application Laid-Open No. 6-135738 are blended and mixed. Then, the mixture is fused, agitated, and homogenized using a platinum crucible, and then, the resulting product is molded into a block shape and annealed, whereby it is possible to obtain optical glass satisfying expressions (1), (2), and (3).

Alternatively, S-TIM27 (product name) (nd=1.63980, vd=34.5, θgF=0.5922) manufactured by Ohara Inc. and optical glass (nd=1.69072, vd=36.2, θgF=0.5775) in a sixth exemplary embodiment of Japanese Patent Application Laid-Open No. 10-265238 may be mixed in a ratio of 2:3. Also in this case, it is possible to obtain glass material (nd=1.67035, vd=35.5, θgF=0.5834) satisfying conditional expressions (1), (2), and (3).

It is desirable that the optical element G satisfying expressions (1), (2), and (3) should be formed of a glass material. This is because it is easier to manufacture a glass material than an organic material such as resin. Further, constraints on thickness are smaller in the molding of a glass material than in the molding of a resin. Thus, the optical element G is formed using a glass material, whereby it is possible to increase the degree of freedom in designing the refractive power of the optical element G. Further, a glass material has excellent environment resistance to changes in humidity and temperature and also has sufficient hardness. Thus, the optical element G can also be used as the lens disposed closest to the object side in the optical system.

Further, it is desirable that the optical system according to each exemplary embodiment should satisfy one or more of the following conditional expressions (11) to (16).

$$0.02 < |fA|/f < 3.0 \quad (11)$$

$$1.5 < (rna+rnb)/(rna-rnb) < 8.0 \quad (12)$$

$$-0.6 < (rpa+rpb)/(rpa-rpb) < 0.5 \quad (13)$$

$$0.24 < |dA/fA| < 7.0 \quad (14)$$

$$0.7 < nP/nN < 1.2 \quad (15)$$

$$0.8 < |fF/fR| < 290 \quad (16)$$

In expression (11), f represents the focal length of the entire optical system. In a case where the optical system is a zoom lens, f represents the focal length of the entire system at the telephoto end. fA represents the focal length of the optical element G when the refracting surface on the light incident side and the refracting surface on the light exit side of the optical element G are both exposed to air.

In expression (12), rna represents the radius of curvature on the object side of the optical element G placed as a negative lens on the magnification side with respect to the point P, and rnb represents the radius of curvature on the image side of the optical element G.

In expression (13), rpa represents the radius of curvature on the object side of the optical element G placed as a positive lens on the reduction side with respect to the point P, and rpb represents the radius of curvature on the image side of the optical element G.

In expression (14), dA represents the distance on the optical axis from the refracting surface, on the side closer to the aperture stop SP, of the optical element G to the aperture stop SP. In a case where the optical system is a zoom lens, dA represents the distance on the optical axis from the refracting surface, on the side closer to the aperture stop SP, of the optical element G at the telephoto end to the aperture stop SP.

In expression (15), nP represents a value obtained by averaging the refractive indices at the d-line of all positive lenses in the optical system. nN is a value obtained by averaging the refractive indices at the d-line of all negative lenses in the optical system.

In expression (16), fR represents the focal length of a lens unit placed on the light exit side of the aperture stop SP. In expression (16), fF represents the focal length of a lens unit placed on the light incident side of the aperture stop SP. In a case where the optical system is a zoom lens, both fR and fF are values at the telephoto end.

Expression (11) defines the relationship between the focal length of the optical element G and the focal length of the entire system. If the refractive power of the optical element G is so weak that the relationship exceeds the upper limit of expression (11), it is difficult to sufficiently reduce primary chromatic aberration. On the other hand, if the refractive power of the optical element G is so strong that the relationship falls below the lower limit of expression (11), this is advantageous for the correction of primary chromatic aberration, but chromatic field curvature occurs, which is not desirable. Further, if the curvature of the optical element G is so strong that the relationship falls below the lower limit of expression (11), the optical system becomes large.

Further, to shorten the entire lens length while correcting the secondary spectrum of chromatic aberration, it is desirable that expression (11) should be in the range of the following expression (11a). It is more desirable that expression (11) should be in the range of expression (11b).

$$0.1 < |fA|/f < 2.1 \quad (11a)$$

$$0.2 < |fA|/f < 1.0 \quad (11b)$$

Expression (12) is related to the shape factor of the optical element G when the optical element G is placed on the magnification side with respect to the point P. In this case, the optical element G is a negative lens.

If the shape factor of the optical element G exceeds the upper limit, it is difficult to excellently correct chromatic aberration, field curvature, and comatic aberration. Further, if the shape factor of the optical element G falls below the lower limit, spherical aberration increases, which is not desirable.

Further, to reduce spherical aberration while effectively correcting axial chromatic aberration, it is desirable that expression (12) should be in the range of the following expression (12a). It is more desirable that expression (12) should be in the range of expression (12b).

$$2.0 < (rna+rnb)/(rna-rnb) < 7.5 \quad (12a)$$

$$2.5 < (rna+rnb)/(rna-rnb) < 7.2 \quad (12b)$$

Expression (13) is related to the shape factor of the optical element G when the optical element G is placed on the reduction side with respect to the point P. In this case, the optical element G is a positive lens.

If the shape factor of the optical element G exceeds the upper limit, it is difficult to correct various types of aberration such as magnification chromatic aberration. Particularly, it is difficult to excellently correct the secondary spectrum of magnification chromatic aberration. Further, if the shape factor of the optical element G falls below the lower limit, chromatic field curvature is likely to occur, which is not desirable.

Further, to reduce comatic aberration while effectively correcting the secondary spectrum of magnification chromatic aberration, it is desirable that expression (13) should be in the range of the following expression (13a). It is more desirable that expression (13) should be in the range of expression (13b).

$$-0.5<(rpa+rpb)/(rpa-rpb)<0.2 \quad (13a)$$

$$-0.4<(rpa+rpb)/(rpa-rpb)<0.1 \quad (13b)$$

Expression (14) is related to the position of the optical element G in the optical system. From expression (10), the higher the height at which the chief paraxial ray is incident on the optical element G, the greater the effect of the optical element G correcting magnification chromatic aberration. If the optical element G is placed at a position so close to the aperture stop SP as to fall below the lower limit of expression (14), the height at which the chief paraxial ray is incident on the optical element G becomes too small. Thus, it is difficult to sufficiently correct magnification chromatic aberration.

On the other hand, if the optical element G is placed at a position so distant from the aperture stop SP as to exceed the upper limit of expression (14), this is advantageous for the correction of magnification chromatic aberration, but the optical system becomes large, which is not desirable.

It is desirable that expression (14) should be in the range of the following expression (14a). It is more desirable that expression (14) should be in the range of expression (14b).

$$0.3<|dA/fA|<6.3 \quad (14a)$$

$$0.5<|dA/fA|<1.2 \quad (14b)$$

Expression (15) is related to the ratio between the average value of the refractive indices of the negative lenses in the optical system and the average value of the refractive indices of the positive lenses in the optical system. The optical element G is provided in an optical system satisfying expression (15), whereby it is possible to further reduce field curvature and chromatic aberration. If nP is so great that the ratio exceeds the upper limit of expression (15), the range of choice of a material for forming the positive lenses becomes narrow, and the Abbe numbers of the positive lenses included in the optical system become too small as a whole. As a result, it is difficult to sufficiently reduce axial chromatic aberration.

On the other hand, if nP is so small that the ratio falls below the lower limit of expression (15), the refractive indices of the positive lenses included in the optical system become too small as a whole, and the Petzval sum becomes too large in the positive direction. In this case, it is difficult to reduce field curvature. If an attempt is made to sufficiently reduce field curvature, the optical system becomes large.

It is desirable that expression (15) should be in the range of the following expression (15a). It is more desirable that expression (15) should be in the range of expression (15b).

$$0.80<nP/nN<1.0 \quad (15a)$$

$$0.85<nP/nN<0.96 \quad (15b)$$

Expression (16) is related to the ratio between the focal length of the lens unit placed on the light incident side of the aperture stop SP and the focal length of the lens unit placed on the light exit side of the aperture stop SP. The optical element G is provided in an optical system satisfying expression (16), whereby it is possible to shorten the entire length of the optical system while sufficiently correcting various types of aberration.

If the number of lenses included in the lens unit placed on the light incident side of the aperture stop SP is increased to make greater the absolute value of the focal length of the lens unit placed on the light incident side of the aperture stop SP, this is more advantageous for the correction of chromatic aberration and field curvature. However, if the absolute value of fF is so great that the ratio exceeds the upper limit of expression (16), the entire length of the optical system becomes too great.

If the absolute value of fF is so small that the ratio falls below the lower limit of expression (16), it is difficult to sufficiently correct chromatic aberration and field curvature. Further, if the ratio falls below the lower limit of expression (16), the refractive power of the lens unit placed on the light incident side of the aperture stop SP becomes too strong, and it is difficult to secure back focus.

Further, to make the stop diameter small, it is desirable that expression (16) should be in the range of the following expression (16a). It is more desirable that expression (16) should be in the range of expression (16b).

$$0.9<fF/fR<50 \quad (16a)$$

$$8<fF/fR<25 \quad (16b)$$

To further enhance the effect of the optical element G correcting chromatic aberration and field curvature, it is desirable to give somewhat large refractive power to the optical element G. Thus, in a case where the optical element G is a positive lens placed on the reduction side with respect to the point P, it is desirable that the refractive power of the optical element G should be the strongest among those of positive lenses placed on the reduction side with respect to the point P.

Further, in a case where the optical element G is a negative lens placed on the magnification side with respect to the point P, it is desirable that the optical element G should be placed closest to the magnification side among all the negative lenses in the optical system. This can make the incident height of the chief paraxial ray in the optical element G great and further enhance the effect of the optical element G correcting magnification chromatic aberration.

The optical system according to the present invention may include a plurality of optical elements G satisfying expressions (1) to (3).

Next, the first to sixth exemplary embodiments will be described.

In the first exemplary embodiment, fourteenth and fifteenth lenses are the optical element G. In the second exemplary embodiment, fourteenth and seventeenth lenses are the optical element G. In the third exemplary embodiment, a third lens is the optical element G. In the fourth exemplary embodiment, second and twentieth lenses are the optical element G. In the fifth exemplary embodiment, second and twentieth lenses are the optical element G. In the sixth exemplary embodiment, second and twentieth lenses are the optical element G.

As described above, the optical system according to each exemplary embodiment includes at least one optical element G satisfying expressions (1) to (3), thereby excellently correcting chromatic aberration and field curvature.

First to sixth numerical exemplary embodiments corresponding to the first to sixth exemplary embodiments are illustrated below.

In surface data of each numerical exemplary embodiment, r represents the radius of curvature of each optical surface, and d (mm) represents the axial space (the distance on the optical axis) between an m-th surface and an (m+1)-th surface. m represents the number of a surface counted from the light incident side. Further, nd represents the refractive index at the d-line of each optical member, vd represents the Abbe number at the d-line of the optical member, and θgF represents the partial dispersion ratio at the g-line and the F-line of the optical member.

In the surface data of each numerical exemplary embodiment, the symbol "*" (asterisk) is added after the surface number of an optical surface having an aspheric surface shape. Further, aspheric surface data illustrates aspheric surface coefficients of each aspheric surface. In the aspheric surface coefficients, "e±A" means "×10^{±A}". The aspheric surface shape of the optical surface is represented by the following expression (17), $$X = \frac{\frac{H^2}{R}}{1+\sqrt{1-(1+K)\left(\frac{H}{R}\right)^2}} + A4H^4 + A6H^6 + A8H^8 + A10H^{10} + A12H^{12} \quad (17)$$

where X is the amount of displacement from the surface vertex in the optical axis direction, H is the height from the optical axis in a direction perpendicular to the optical axis direction, R is the paraxial radius of curvature, K is a conic constant, and A4, A6, A8, A10, and A12 are aspheric surface coefficients.

In each numerical exemplary embodiment, all of d, a focal length (mm), an F-number, and a half angle of view (°) are values obtained when the optical system according to each exemplary embodiment focuses on an object at infinity. Back focus BF is the distance from the final lens surface to the image plane. The entire lens length is a value obtained by adding the back focus to the distance from the first lens surface to the final lens surface. A first numerical exemplary embodiment will be described.

(unit: mm)

Surface Data

| Surface number | r | d | nd | vd | θgF |
|---|---|---|---|---|---|
| 1 | 150.203 | 16.20 | 1.59270 | 35.31 | 0.5933 |
| 2 | 720.830 | 100.00 | | | |
| 3 | 102.935 | 15.03 | 1.43387 | 95.10 | 0.5373 |
| 4 | −349.019 | 0.25 | | | |
| 5 | −340.206 | 3.00 | 1.85478 | 24.80 | 0.6122 |
| 6 | 82.422 | 3.06 | | | |
| 7 | 83.827 | 13.05 | 1.43387 | 95.10 | 0.5373 |
| 8 | −1054.911 | 29.29 | | | |
| 9 | 69.179 | 6.24 | 1.89286 | 20.36 | 0.6393 |
| 10 | 130.865 | 5.00 | | | |
| 11 | 64.898 | 2.30 | 1.67300 | 38.15 | 0.5754 |
| 12 | 45.435 | 2.03 | | | |
| 13 | 57.495 | 6.55 | 1.43387 | 95.10 | 0.5373 |
| 14 | 119.415 | 7.99 | | | |
| 15 (stop) | ∞ | 5.05 | | | |
| 16 | −5145.427 | 1.87 | 1.91082 | 35.25 | 0.5824 |
| 17 | 66.104 | 33.29 | | | |
| 18 | 85.970 | 2.50 | 1.80809 | 22.76 | 0.6285 |
| 19 | 46.188 | 10.04 | 1.57501 | 41.50 | 0.5767 |
| 20 | −112.535 | 1.07 | | | |
| 21 | 179.837 | 4.16 | 1.80610 | 33.27 | 0.5881 |
| 22 | −94.105 | 1.44 | 1.49700 | 81.54 | 0.5375 |
| 23 | 38.338 | 5.51 | | | |
| 24 | −73.606 | 1.47 | 1.69680 | 55.53 | 0.5434 |
| 25 | 75.078 | 4.05 | | | |
| 26 | 84.929 | 7.29 | 1.67542 | 34.82 | 0.5825 |
| 27 | −188.548 | 1.58 | | | |
| 28 | 89.906 | 14.75 | 1.67542 | 34.82 | 0.5825 |
| 29 | −107.536 | 2.00 | 1.80518 | 25.46 | 0.6156 |
| 30 | 6528.688 | 3.03 | | | |
| 31 | ∞ | 2.20 | 1.51633 | 64.14 | 0.5353 |
| 32 | ∞ | 60.70 | | | |
| Image plane | ∞ | | | | |

Various Types of Data

| Focal length | 392.54 |
|---|---|
| F-number | 2.90 |
| Half angle of view (°) | 3.15 |
| Image height | 21.64 |
| Overall lens length | 372.01 |
| BF | 60.70 |

A second numerical exemplary embodiment will be described.

(unit: mm)

Surface Data

| Surface number | r | d | nd | vd | θgF |
|---|---|---|---|---|---|
| 1 | 277.034 | 1.95 | 1.83481 | 42.73 | 0.5648 |
| 2 | 78.236 | 6.47 | 1.49700 | 81.54 | 0.5375 |
| 3 | −579.585 | 0.10 | | | |
| 4 | 76.297 | 5.41 | 1.43387 | 95.10 | 0.5373 |
| 5 | 702.461 | 0.10 | | | |
| 6 | 79.014 | 3.83 | 1.49700 | 81.54 | 0.5375 |
| 7 | 221.639 | (variable) | | | |
| 8* | 50.139 | 1.00 | 1.72903 | 54.04 | 0.5441 |
| 9* | 11.259 | 8.95 | | | |
| 10 | −17.165 | 0.70 | 1.59282 | 68.63 | 0.5446 |
| 11 | 290.855 | 0.10 | | | |
| 12 | 35.241 | 5.96 | 1.75211 | 25.05 | 0.6190 |
| 13 | −12.993 | 0.60 | 2.00100 | 29.13 | 0.5997 |
| 14 | −60.588 | (variable) | | | |
| 15 (stop) | ∞ | (variable) | | | |
| 16* | 15.888 | 2.97 | 1.49700 | 81.61 | 0.5386 |
| 17* | −111.082 | 4.65 | | | |
| 18 | 43.674 | 1.66 | 1.49700 | 81.54 | 0.5375 |
| 19 | −115.426 | 4.17 | | | |
| 20 | 112.858 | 0.45 | 1.95375 | 32.32 | 0.5898 |
| 21 | 11.025 | 2.66 | 1.48749 | 70.23 | 0.5300 |
| 22 | 476.148 | 2.60 | | | |
| 23 | 29.949 | 1.52 | 1.62004 | 36.26 | 0.5879 |
| 24 | −72.380 | (variable) | | | |
| 25 | 49.927 | 1.24 | 1.67542 | 34.82 | 0.5825 |
| 26 | −59.622 | 0.60 | 1.77250 | 49.60 | 0.5520 |
| 27* | 28.517 | (variable) | | | |
| 28 | 18.841 | 0.50 | 1.91082 | 35.25 | 0.5824 |
| 29 | 9.245 | 5.82 | 1.67542 | 34.82 | 0.5825 |
| 30 | −11.373 | 0.70 | 1.85135 | 40.10 | 0.5695 |
| 31* | 30.744 | (variable) | | | |
| Image plane | ∞ | | | | |

Aspheric Surface Data

Eighth surface

K = 0.00000e+000   A4 = 2.47795e−005   A6 = −1.74662e−007
A8 = 9.26391e−010   A10 = −1.13242e−012

Ninth surface

K = 0.00000e+000   A4 = 1.96953e−006   A6 = −2.74501e−007

Sixteenth surface

K = 0.00000e+000   A4 = −2.26841e−005   A6 = −7.30345e−008
A8 = −2.65549e−010   A10 = −2.22745e−013

Seventeenth surface

K = 0.00000e+000   A4 = 1.73755e−005   A6 = −5.51244e−008

-continued (unit: mm)

Twenty-seventh surface

K = 0.00000e+000   A4 = −3.65728e−006   A6 = 2.45181e−007
A8 = −9.54069e−009   A10 = 1.12175e−010

Thirty-first surface

K = 0.00000e+000   A4 = −4.82489e−005   A6 = −6.71531e−007
A8 = 1.04746e−008   A10 = −1.18274e−010

Various Types of Data
Zoom ratio 39.04

|  | Wide-angle | Middle | Telephoto |
|---|---|---|---|
| Focal length | 9.06 | 43.42 | 353.84 |
| F-number | 2.88 | 5.00 | 6.49 |
| Half angle of view (°) | 35.52 | 10.00 | 1.28 |
| Image height | 6.47 | 7.65 | 7.89 |
| Overall lens length | 130.70 | 169.20 | 200.00 |
| BF | 3.99 | 23.84 | 19.78 |
| d7 | 1.00 | 45.70 | 84.66 |
| d14 | 43.36 | 10.50 | 0.68 |
| d15 | 4.91 | 15.10 | 0.29 |
| d24 | 4.33 | 3.93 | 1.49 |
| d27 | 8.40 | 5.41 | 28.38 |
| d31 | 3.99 | 23.84 | 19.78 |

Zoom Lens Unit Data

| Group | Starting surface | Focal length |
|---|---|---|
| 1 | 1 | 114.95 |
| 2 | 8 | −13.42 |
| 3 | 16 | 24.66 |
| 4 | 25 | −67.60 |
| 5 | 28 | −63.13 |

A third numerical exemplary embodiment will be described.

(unit: mm)

Surface Data

| Surface number | r | d | nd | vd | θgF |
|---|---|---|---|---|---|
| 1 | 120.056 | 3.00 | 1.67300 | 38.15 | 0.5754 |
| 2 | 86.093 | 11.11 | 1.49700 | 81.54 | 0.5375 |
| 3 | 6846.686 | 6.50 | | | |
| 4 | 83.832 | 2.50 | 1.67542 | 34.82 | 0.5825 |
| 5 | 63.264 | 8.21 | 1.49700 | 81.54 | 0.5375 |
| 6 | 237.424 | (variable) | | | |
| 7 | 275.103 | 1.50 | 1.80400 | 46.57 | 0.5572 |
| 8 | 42.358 | 6.18 | | | |
| 9 | −85.745 | 1.40 | 1.53775 | 74.70 | 0.5392 |
| 10 | 50.630 | 4.80 | 1.85478 | 24.80 | 0.6122 |
| 11 | 1527.793 | 2.42 | | | |
| 12 | −67.236 | 1.50 | 1.69680 | 55.53 | 0.5434 |
| 13 | 519.433 | (variable) | | | |
| 14 | 115.262 | 5.85 | 1.69680 | 55.53 | 0.5434 |
| 15 | −63.867 | 0.15 | | | |
| 16 | 97.855 | 4.02 | 1.43875 | 94.93 | 0.5340 |
| 17 | −215.445 | 1.90 | | | |
| 18 | −62.883 | 1.70 | 1.80610 | 33.27 | 0.5881 |
| 19 | −312.899 | (variable) | | | |
| 20 (stop) | ∞ | 2.50 | | | |
| 21 | 260.000 | 4.42 | 1.59522 | 67.74 | 0.5442 |
| 22 | −76.000 | 0.20 | | | |
| 23 | 48.352 | 5.30 | 1.72916 | 54.68 | 0.5444 |
| 24 | −363.922 | 0.64 | | | |
| 25 | −153.344 | 1.60 | 1.85478 | 24.80 | 0.6122 |
| 26 | 155.105 | (variable) | | | |
| 27 | −291.410 | 4.48 | 1.85025 | 30.05 | 0.5979 |
| 28 | −46.574 | 1.60 | 1.77250 | 49.60 | 0.5520 |
| 29 | 40.427 | (variable) | | | |
| 30 | 57.811 | 4.22 | 1.49700 | 81.54 | 0.5375 |
| 31 | 178.409 | 0.90 | | | |
| 32 | 551.539 | 2.00 | 1.80518 | 25.42 | 0.6161 |
| 33 | 119.956 | 8.90 | 1.59522 | 67.74 | 0.5442 |
| 34 | −47.692 | (variable) | | | |
| 35 | −46.765 | 2.40 | 1.60562 | 43.70 | 0.5721 |
| 36 | 58.751 | 4.42 | | | |
| 37 | 81.269 | 7.38 | 1.90043 | 37.37 | 0.5774 |
| 38 | −135.685 | 54.96 | | | |
| Image plane | ∞ | | | | |

Various Types of Data
Zoom ratio 2.67

|  | Wide-angle | Middle | Telephoto |
|---|---|---|---|
| Focal length | 72.23 | 140.52 | 192.61 |
| F-number | 2.86 | 2.91 | 2.87 |
| Half angle of view (°) | 16.68 | 8.75 | 6.4 |
| Image height | 21.64 | 21.64 | 21.64 |
| Overall lens length | 259.17 | 259.17 | 259.17 |
| BF | 54.96 | 54.96 | 54.96 |
| d6 | 1.76 | 42.90 | 58.97 |
| d13 | 20.65 | 7.57 | 1.32 |
| d19 | 39.60 | 11.53 | 1.71 |
| d26 | 3.26 | 5.33 | 3.68 |
| d29 | 19.13 | 16.09 | 19.10 |
| d34 | 6.12 | 7.09 | 5.73 |

Zoom Lens Unit Data

| Group | Starting surface | Focal length |
|---|---|---|
| 1 | 1 | 150.44 |
| 2 | 7 | −32.68 |
| 3 | 14 | 71.45 |
| 4 | 20 | 58.79 |
| 5 | 27 | −48.78 |
| 6 | 30 | 58.03 |
| 7 | 35 | −305.11 |

A fourth numerical exemplary embodiment will be described.

(unit: mm)

Surface Data

| Surface number | r | d | nd | vd | θgF |
|---|---|---|---|---|---|
| 1 | 120.851 | 3.33 | 1.48749 | 70.23 | 0.5300 |
| 2 | 315.461 | 12.15 | | | |
| 3 | 95.307 | 2.10 | 1.66565 | 35.64 | 0.5824 |
| 4 | 49.107 | 6.40 | 1.49700 | 81.54 | 0.5375 |
| 5 | 307.760 | 0.15 | | | |
| 6 | 75.771 | 4.96 | 1.43875 | 94.66 | 0.5340 |
| 7 | −948.148 | (variable) | | | |
| 8 | −392.683 | 1.10 | 1.91082 | 35.25 | 0.5824 |
| 9 | 38.248 | 4.53 | | | |
| 10 | −48.536 | 1.15 | 1.48749 | 70.23 | 0.5300 |
| 11 | 44.085 | 4.32 | 1.84666 | 23.78 | 0.6205 |
| 12 | −106.227 | 0.71 | | | |
| 13 | −60.502 | 1.15 | 1.77250 | 49.60 | 0.5520 |
| 14 | 2593.264 | (variable) | | | |
| 15 | 206.750 | 5.29 | 1.77250 | 49.60 | 0.5520 |
| 16 | −31.897 | 1.30 | 2.00100 | 29.13 | 0.5997 |
| 17 | −67.197 | (variable) | | | |
| 18 (stop) | ∞ | 0.15 | | | |
| 19 | 30.956 | 3.50 | 1.80400 | 46.57 | 0.5572 |
| 20 | 64.686 | 3.33 | | | |
| 21 | 36.964 | 5.70 | 1.90366 | 31.32 | 0.5946 |
| 22 | 17.578 | 4.95 | 1.49700 | 81.54 | 0.5375 |
| 23 | 78.241 | 3.99 | | | |
| 24 | 59.130 | 3.78 | 1.85478 | 24.80 | 0.6122 |
| 25 | −67.372 | 1.00 | 1.59551 | 39.24 | 0.5803 |
| 26 | 40.858 | 2.22 | | | |

-continued (unit: mm)

| | | | | | |
|---|---|---|---|---|---|
| 27 | −100.615 | 1.00 | 1.83400 | 37.34 | 0.5790 |
| 28 | 44.661 | 2.37 | | | |
| 29 | 110.296 | 2.82 | 1.91082 | 35.25 | 0.5824 |
| 30 | −88.626 | 0.15 | | | |
| 31 | 61.598 | 6.20 | 1.48749 | 70.23 | 0.5300 |
| 32 | −24.988 | 1.40 | 1.91082 | 35.25 | 0.5824 |
| 33 | 87.005 | 8.48 | | | |
| 34 | 82.280 | 4.73 | 1.63980 | 36.20 | 0.5778 |
| 35 | −80.687 | 56.43 | | | |
| Image plane | ∞ | | | | |

Various Types of Data
Zoom ratio 2.70

| | Wide-angle | Middle | Telephoto |
|---|---|---|---|
| Focal length | 72.09 | 118.86 | 194.61 |
| F-number | 4.10 | 4.10 | 4.10 |
| Half angle of view (°) | 16.71 | 10.32 | 6.34 |
| Image height | 21.64 | 21.64 | 21.64 |
| Overall lens length | 203.43 | 203.43 | 203.43 |
| BF | 56.43 | 56.43 | 56.43 |
| d7 | 1.94 | 22.95 | 35.85 |
| d14 | 27.29 | 17.40 | 1.00 |
| d17 | 13.37 | 2.25 | 5.75 |

Zoom Lens Unit Data

| Group | Starting surface | Focal length |
|---|---|---|
| 1 | 1 | 97.89 |
| 2 | 8 | −29.05 |
| 3 | 15 | 87.60 |
| 4 | 18 | 104.15 |

A fifth numerical exemplary embodiment will be described.

(unit: mm)

Surface Data

| Surface number | r | d | nd | vd | θgF |
|---|---|---|---|---|---|
| 1 | 124.480 | 3.36 | 1.48749 | 70.23 | 0.5300 |
| 2 | 347.938 | 12.18 | | | |
| 3 | 107.441 | 2.10 | 1.62606 | 39.09 | 0.5762 |
| 4 | 46.739 | 6.73 | 1.49700 | 81.54 | 0.5375 |
| 5 | 302.580 | 0.15 | | | |
| 6 | 71.156 | 5.26 | 1.43875 | 94.66 | 0.5340 |
| 7 | −729.623 | (variable) | | | |
| 8 | −393.869 | 1.10 | 1.91082 | 35.25 | 0.5824 |
| 9 | 38.677 | 4.89 | | | |
| 10 | −46.952 | 1.15 | 1.48749 | 70.23 | 0.5300 |
| 11 | 45.354 | 4.31 | 1.84666 | 23.78 | 0.6205 |
| 12 | −102.877 | 0.64 | | | |
| 13 | −62.785 | 1.15 | 1.77250 | 49.60 | 0.5520 |
| 14 | 1106.189 | (variable) | | | |
| 15 | 219.679 | 5.25 | 1.77250 | 49.60 | 0.5520 |
| 16 | −32.206 | 1.30 | 2.00100 | 29.13 | 0.5997 |
| 17 | −67.327 | (variable) | | | |
| 18 (stop) | ∞ | 0.15 | | | |
| 19 | 31.728 | 3.53 | 1.80400 | 46.57 | 0.5572 |
| 20 | 72.353 | 2.95 | | | |
| 21 | 36.352 | 5.58 | 1.90366 | 31.32 | 0.5946 |
| 22 | 17.617 | 4.98 | 1.49700 | 81.54 | 0.5375 |
| 23 | 88.734 | 4.72 | | | |
| 24 | 62.192 | 3.71 | 1.85478 | 24.80 | 0.6122 |
| 25 | −66.129 | 1.00 | 1.59551 | 39.24 | 0.5803 |
| 26 | 47.810 | 2.07 | | | |
| 27 | −94.527 | 1.00 | 1.83400 | 37.34 | 0.5790 |
| 28 | 39.028 | 2.40 | | | |
| 29 | 204.293 | 2.82 | 1.91082 | 35.25 | 0.5824 |
| 30 | −78.350 | 0.15 | | | |
| 31 | 58.344 | 6.17 | 1.48749 | 70.23 | 0.5300 |
| 32 | −25.500 | 1.40 | 1.91082 | 35.25 | 0.5824 |

-continued (unit: mm)

| | | | | | |
|---|---|---|---|---|---|
| 33 | 103.330 | 9.39 | | | |
| 34 | 92.382 | 4.64 | 1.65460 | 37.95 | 0.5675 |
| 35 | −70.742 | 50.39 | | | |
| Image plane | ∞ | | | | |

Various Types of Data
Zoom ratio 2.70

| | Wide-angle | Middle | Telephoto |
|---|---|---|---|
| Focal length | 67.16 | 110.69 | 181.31 |
| F-number | 4.10 | 4.10 | 4.10 |
| Half angle of view (°) | 17.86 | 11.06 | 6.80 |
| Image height | 21.64 | 21.64 | 21.64 |
| Overall lens length | 199.12 | 199.12 | 199.12 |
| BF | 50.39 | 50.39 | 50.39 |
| d7 | 1.87 | 22.82 | 35.78 |
| d14 | 27.16 | 17.37 | 1.00 |
| d17 | 13.45 | 2.30 | 5.71 |

Zoom Lens Unit Data

| Group | Starting surface | Focal length |
|---|---|---|
| 1 | 1 | 97.88 |
| 2 | 8 | −29.03 |
| 3 | 15 | 88.95 |
| 4 | 18 | 96.94 |

A sixth numerical exemplary embodiment will be described.

(unit: mm)

Surface Data

| Surface number | r | d | nd | vd | θgF |
|---|---|---|---|---|---|
| 1 | 118.282 | 3.27 | 1.48749 | 70.23 | 0.5300 |
| 2 | 263.809 | 12.17 | | | |
| 3 | 92.817 | 2.10 | 1.72439 | 32.05 | 0.5867 |
| 4 | 53.958 | 6.08 | 1.49700 | 81.54 | 0.5375 |
| 5 | 573.020 | 0.15 | | | |
| 6 | 80.740 | 4.74 | 1.43875 | 94.66 | 0.5340 |
| 7 | −3060.828 | (variable) | | | |
| 8 | −401.987 | 1.10 | 1.91082 | 35.25 | 0.5824 |
| 9 | 38.614 | 4.35 | | | |
| 10 | −51.918 | 1.15 | 1.48749 | 70.23 | 0.5300 |
| 11 | 43.108 | 4.33 | 1.84666 | 23.78 | 0.6205 |
| 12 | −113.084 | 0.79 | | | |
| 13 | −59.690 | 1.15 | 1.77250 | 49.60 | 0.5520 |
| 14 | 2164.740 | (variable) | | | |
| 15 | 205.952 | 5.29 | 1.77250 | 49.60 | 0.5520 |
| 16 | −31.940 | 1.30 | 2.00100 | 29.13 | 0.5997 |
| 17 | −68.181 | (variable) | | | |
| 18 (stop) | ∞ | 0.15 | | | |
| 19 | 30.883 | 3.49 | 1.80400 | 46.57 | 0.5572 |
| 20 | 64.208 | 3.15 | | | |
| 21 | 36.409 | 5.74 | 1.90366 | 31.32 | 0.5946 |
| 22 | 17.515 | 5.17 | 1.49700 | 81.54 | 0.5375 |
| 23 | 85.459 | 2.19 | | | |
| 24 | 57.415 | 3.75 | 1.85478 | 24.80 | 0.6122 |
| 25 | −83.560 | 1.00 | 1.59551 | 39.24 | 0.5803 |
| 26 | 38.241 | 2.70 | | | |
| 27 | −112.100 | 1.00 | 1.83400 | 37.34 | 0.5790 |
| 28 | 47.109 | 4.82 | | | |
| 29 | 320.608 | 2.55 | 1.91082 | 35.25 | 0.5824 |
| 30 | −85.737 | 0.15 | | | |
| 31 | 60.025 | 6.78 | 1.48749 | 70.23 | 0.5300 |
| 32 | −24.456 | 1.40 | 1.91082 | 35.25 | 0.5824 |
| 33 | 116.866 | 4.72 | | | |
| 34 | 89.543 | 4.42 | 1.70771 | 31.16 | 0.5958 |
| 35 | −78.496 | 59.42 | | | |
| Image plane | ∞ | | | | |

-continued (unit: mm)

Various Types of Data
Zoom ratio 2.66

|  | Wide-angle | Middle | Telephoto |
|---|---|---|---|
| Focal length | 71.96 | 117.40 | 191.62 |
| F-number | 4.10 | 4.10 | 4.10 |
| Half angle of view (°) | 16.73 | 10.44 | 6.44 |
| Image height | 21.64 | 21.64 | 21.64 |
| Overall lens length | 203.58 | 203.58 | 203.58 |
| BF | 59.42 | 59.42 | 59.42 |
| d7 | 2.05 | 22.87 | 35.96 |
| d14 | 27.92 | 18.17 | 1.85 |
| d17 | 13.04 | 1.97 | 5.20 |

Zoom Lens Unit Data

| Group | Starting surface | Focal length |
|---|---|---|
| 1 | 1 | 98.44 |
| 2 | 8 | −29.39 |
| 3 | 15 | 89.08 |
| 4 | 18 | 103.65 |

Various numerical values in the numerical exemplary embodiments are collectively illustrated in table 1.

[Optical Apparatus]

Figure 14:
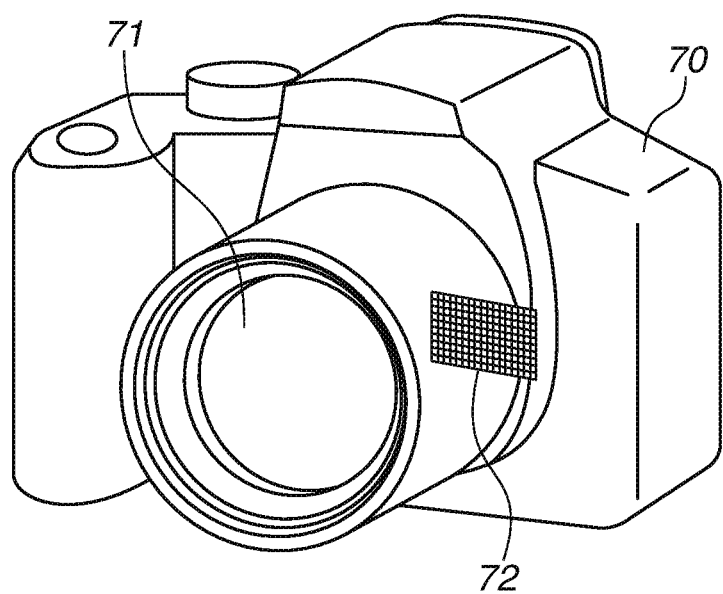
FIG. 14 is a schematic diagram of an imaging apparatus.

FIG. 14 is a schematic diagram of an imaging apparatus (digital still camera) 100 as an optical apparatus according to an exemplary embodiment of the present invention. The imaging apparatus 100 according to the present exemplary embodiment includes a camera main body 70, an optical system 71, which is similar to any of the first to sixth exemplary embodiments, and a light-receiving element (image sensor) 72, which photoelectrically converts an image formed by the optical system 71.

Since the imaging apparatus 100 according to the present exemplary embodiment includes the optical system 71, which is similar to any of the first to sixth exemplary embodiments, a high-grade image with chromatic aberration and field curvature being excellently corrected can be obtained by the imaging apparatus 100. As the light-receiving element 72, an image sensor such as a CCD sensor and a CMOS sensor can be used. At this time, various types of aberration such as distortion and chromatic aberration of an image acquired by the light-receiving element 72 are electrically corrected, whereby it is possible to enhance the image quality of an output image.

The optical system according to each of the above exemplary embodiments can be applied not only to the digital still camera illustrated in FIG. 14, but also to various optical apparatuses such as a silver-halide film camera, a video camera, and a telescope.

While desirable exemplary embodiments of the present invention have been described, the present invention is not limited to the desirable exemplary embodiments, and the desirable exemplary embodiments can be combined, modified, and changed in various manners within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

TABLE 1

|  | First exemplary embodiment | | Second exemplary embodiment | | Third exemplary embodiment | Fourth exemplary embodiment | | Fifth exemplary embodiment | | Sixth exemplary embodiment | |
|---|---|---|---|---|---|---|---|---|---|---|---|
| f | 392.543 | | 353.836 | | 192.609 | 194.612 | | 181.311 | | 191.62 | |
| Lens number | 14 | 15 | 14 | 17 | 3 | 2 | 20 | 2 | 20 | 2 | 20 |
| (1) νd | 34.82 | 34.82 | 34.82 | 34.82 | 34.82 | 35.64 | 36.2 | 39.09 | 37.95 | 32.05 | 31.16 |
| nd | 1.67542 | 1.67542 | 1.67542 | 1.67542 | 1.67542 | 1.66565 | 1.6398 | 1.62606 | 1.6546 | 1.72439 | 1.70771 |
| (2) nd − 14.387/νd | 1.2622 | 1.2622 | 1.2622 | 1.2622 | 1.2622 | 1.262 | 1.2424 | 1.258 | 1.2755 | 1.2755 | 1.246 |
| θgF | 0.5825 | 0.5825 | 0.5825 | 0.5825 | 0.5825 | 0.5824 | 0.5778 | 0.5762 | 0.5675 | 0.5867 | 0.5958 |
| (3) θgF − 2.9795/νd | 0.4969 | 0.4969 | 0.4969 | 0.4969 | 0.4969 | 0.4988 | 0.4955 | 0.5 | 0.489 | 0.4937 | 0.5002 |
| fA | 87.635 | 74.75 | 40.415 | 8.51917 | −401.444 | −155 | 64.402 | −133.923 | 61.9 | −182.055 | 59.755 |
| (11) |fA/f| | 0.223 | 0.19 | 0.114 | 0.024 | 2.084 | 0.796 | 0.331 | 0.739 | 0.341 | 0.95 | 0.312 |
| rna | — | — | — | — | 83.832 | 95.307 | — | 107.441 | — | 92.817 | — |
| rnb | — | — | — | — | 63.264 | 49.107 | — | 46.739 | — | 53.958 | — |
| (12) (rna + rnb)/(rna − rnb) | — | — | — | — | 7.152 | 3.126 | — | 2.54 | — | 3.777 | — |
| rpa | 84.929 | 89.906 | 49.927 | 9.245 | — | — | 82.28 | — | 92.382 | — | 89.543 |
| rpb | −188.548 | −107.536 | −59.622 | −11.373 | — | — | −80.687 | — | −70.742 | — | −78.496 |
| (13) (rpa + rpb)/(rpa − rpb) | −0.379 | −0.089 | −0.088 | −0.103 | — | — | 0.01 | — | 0.133 | — | 0.066 |
| dA | 70.443 | 79.316 | 22.462 | 53.178 | 101.636 | 73.668 | 51.033 | 74.422 | 52.032 | 73.431 | 48.772 |
| (14) |dA/fA| | 0.804 | 1.061 | 0.556 | 6.242 | 0.253 | 0.475 | 0.792 | 0.556 | 0.841 | 0.403 | 0.816 |
| nN | 1.74938 | | 1.83076 | | 1.72312 | 1.78683 | | 1.78243 | | 1.77867 | |
| nP | 1.61324 | | 1.56324 | | 1.65015 | 1.65784 | | 1.65919 | | 1.66402 | |
| (15) nP/nN | 0.922 | | 0.854 | | 0.958 | 0.928 | | 0.931 | | 0.936 | |
| fF | 180.011 | | −173.823 | | −27970 | −2264.321 | | −1856.91 | | −2106.168 | |
| fR | −194.812 | | 17.44 | | 96.561 | 104.154 | | 96.937 | | 103.646 | |
| (16) |fF/fR| | 0.924 | | 9.967 | | 289.659 | 21.74 | | 19.156 | | 20.321 | |

This application claims the benefit of Japanese Patent Application No. 2016-193120, filed Sep. 30, 2016, which is hereby incorporated by reference herein in its entirety.

What is claimed is:

1. An optical system in which a distance to an optical axis from a position where a paraxial marginal ray enters a lens surface closest to a magnification side is greater than a maximum value of a distance to the optical axis from a position where the paraxial marginal ray enters a lens surface on a reduction side with respect to an intersection point P between the optical axis and a chief paraxial ray, the optical system comprising:

an optical element, wherein the following conditional expressions are satisfied:

$$30 \leq vd \leq 40$$

$$1.225 \leq [nd-(14.387/vd)] \leq 1.276$$

$$0.4300 \leq [\theta gF-(2.9795/vd)] \leq 0.5010,$$

where vd is an Abbe number of the optical element, θgF is a partial dispersion ratio of the optical element for g-line and F-line, and nd is a refractive index of the optical element for d-line, and wherein, in a case where the optical element is disposed on the magnification side with respect to the point P, the optical element is a negative lens, and in a case where the optical element is disposed on the reduction side with respect to the point P, the optical element is a positive lens.

2. The optical system according to claim 1, wherein the following conditional expression is satisfied:

$$0.02 < |fA|/f < 3.0,$$

where f is a focal length of the optical system and fA is a focal length of the optical element.

3. The optical system according to claim 1, wherein the optical element is a negative lens disposed on the magnification side with respect to the point P, and wherein the following conditional expression is satisfied:

$$1.5 < (rna+rnb)/(rna-rnb) < 8.0,$$

where rna is a curvature radius of a refracting surface on an object side of the optical element and rnb is a curvature radius of a refracting surface on an image side of the optical element.

4. The optical system according to claim 1, wherein the optical element is a positive lens disposed on the reduction side with respect to the point, and wherein the following conditional expression is satisfied:

$$-0.6 < (rpa+rpb)/(rpa-rpb) < 0.5,$$

where rpa is a curvature radius of a refracting surface on an object side of the optical element and rpb is a curvature radius of a refracting surface on an image side of the optical element.

5. The optical system according to claim 1, further comprising one or more positive lenses disposed on the reduction side with respect to the point P, wherein among all the positive lenses disposed on the reduction side with respect to the point P, a positive lens having the largest refractive power is the optical element.

6. The optical system according to claim 1, further comprising one or more negative lenses disposed on the magnification side with respect to the point P, wherein among all the negative lenses disposed on the magnification side with respect to the point P, a negative lens disposed on the most magnification side is the optical element.

7. The optical system according to claim 1, further comprising an aperture stop, wherein the following conditional expression is satisfied:

$$0.24 < |dA/fA| < 7.0,$$

where fA is a focal length of the optical element and dA is a distance on an optical axis from a refracting surface of the optical element closer to the aperture stop to the aperture stop.

8. The optical system according to claim 1, further comprising:

one or more negative lenses; and one or more positive lenses, wherein the following conditional expression is satisfied:

$$0.7 < nP/nN < 1.2,$$

where nN is an average value of refractive indices of all negative lenses included in the optical system, and nP is an average value of refractive indices of all positive lenses included in the optical system.

9. The optical system according to claim 1, further comprising an aperture stop, wherein the following conditional expression is satisfied:

$$0.8 < |fF/fR| < 290,$$

where fR is a focal length of a lens unit placed on a light exit side of the aperture stop and fF is a focal length of a lens unit placed on a light incident side of the aperture stop.

10. The optical system according to claim 1, wherein the optical element is formed using a glass material.

11. An optical apparatus comprising the optical system according to claim 1 and an image sensor for receiving light of an image formed by the optical system.

12. The optical system according to claim 1, wherein the paraxial marginal ray is a ray which enters the optical system in parallel to the optical axis.

13. An optical system in which a distance to an optical axis from a position where a paraxial marginal ray enters a lens surface closest to a magnification side is greater than a maximum value of a distance to the optical axis from a position where the paraxial marginal ray enters a lens surface on a reduction side with respect to an intersection point P between the optical axis and a chief paraxial ray, the optical system comprising:

a first optical element disposed on the magnification side with respect to the point P; and a second optical element disposed on the reduction side with respect to the point P, wherein the first and second optical element satisfy following conditional expressions:

$$30 \leq vd \leq 40$$

$$1.225 \leq [nd-(14.387/vd)] \leq 1.276$$

$$0.4300 \leq [\theta gF-(2.9795/vd)] \leq 0.5010,$$

where vd is an Abbe number of the optical element, θgF is a partial dispersion ratio of the optical element for g-line and F-line, and nd is a refractive index of the optical element for d-line, and wherein the first optical element disposed on the magnification side with respect to the point P is a negative lens, and the second optical element disposed on the reduction side with respect to the point P is a positive lens.

14. The optical system according to claim 13, wherein the paraxial marginal ray is a ray which enters the optical system in parallel to the optical axis.

* * * * *